United States Patent
Galizia et al.

(10) Patent No.: US 12,511,424 B2
(45) Date of Patent: Dec. 30, 2025

(54) SYSTEM AND METHOD FOR IMPLEMENTING A MULTI-ATTESTATION FRAMEWORK

(71) Applicant: The Toronto-Dominion Bank, Toronto (CA)

(72) Inventors: Micah Galizia, London (CA); Aleksandar Vlada Kacanski, Boonton, NJ (US); Adrian Panek, Killington, VT (US)

(73) Assignee: The Toronto-Dominion Bank, Toronto (CA)

(*) Notice: Subject to any disclaimer, the term of this patent is extended or adjusted under 35 U.S.C. 154(b) by 289 days.

(21) Appl. No.: 18/329,127

(22) Filed: Jun. 5, 2023

(65) Prior Publication Data
US 2024/0403475 A1    Dec. 5, 2024

(51) Int. Cl.
*G06F 21/62*    (2013.01)
*G06F 16/215*    (2019.01)

(52) U.S. Cl.
CPC ........ *G06F 21/6227* (2013.01); *G06F 16/215* (2019.01)

(58) Field of Classification Search
CPC . G06F 21/6227; G06F 16/215; G06F 21/6218
See application file for complete search history.

(56) References Cited

U.S. PATENT DOCUMENTS 8,990,900 B2    3/2015    Edwards et al.
10,412,074 B2    9/2019    Zhang et al.
(Continued)

FOREIGN PATENT DOCUMENTS

WO    WO-2017219527 A1 *    12/2017    ........... H04N 21/258
WO    WO-2021062160 A1 *    4/2021    ......... G06F 16/2365

OTHER PUBLICATIONS

Alsouri, Sami et al; Group-Based Attestation: Enhancing Privacy and Management in Remote Attestation; International Conference on Trust and Trustworthy Computing—Part of the Lecture Notes in Computer Science book series (Trust 2010, LNSC, vol. 6101); pp. 63-77; Jun. 2010; https://link.springer.com/content/pdf/10.1007/978-3-642-13869-0.pdf#/page=74.
(Continued)

*Primary Examiner* — Tan Doan
(74) *Attorney, Agent, or Firm* — CPST Intellectual Property Inc.; Brett J. Slaney; Amy Scouten

(57) ABSTRACT

Technology is provided for managing access regimes. A method includes generating a first set of tasks to retrieve target properties from a data element as a plurality of fragmented objects, and assigning the tasks to a queue. Nodes perform tasks in the queue. The method includes generating a second set of tasks to process the plurality of fragmented objects into a normalized data structure, and assigning them to the queue. At least some nodes are configured to normalize a respective fragmented object of the second set of tasks into the normalized data structure, and update the queue. In some examples, the normalization is based on a data model that uses a machine learning engine. The method includes generating a third task to generate a final normalized data structure for the data element, and generating the final normalized data structure by aggregating the normalized fragmented objects processed by the nodes.

20 Claims, 11 Drawing Sheets

(56) References Cited

U.S. PATENT DOCUMENTS

| | | | |
|---|---|---|---|
| 11,240,244 B2 | 2/2022 | Murdoch et al. | |
| 2008/0243676 A1* | 10/2008 | Smith | G06Q 40/04 |
| | | | 705/37 |
| 2018/0158143 A1* | 6/2018 | Schmitt | G06Q 40/06 |
| 2018/0349178 A1* | 12/2018 | Painter | G06F 9/5083 |
| 2023/0044731 A1 | 2/2023 | Buendgen et al. | |

OTHER PUBLICATIONS

Abrosin, Moreno et al; Collective Remote Attestation at the Internet of Things Scale: State-of-the-Art and Future Challenges; IEEE Communications Surveys & Tutorials; vol. 22; Issue 4; Fourth Quarter 2020; pp. 2447-2461; Jul. 13, 2020 https://ieeexplore.ieee.org/document/9139454.

* cited by examiner

SYSTEM AND METHOD FOR IMPLEMENTING A MULTI-ATTESTATION FRAMEWORK

TECHNICAL FIELD

The following relates generally to managing digital environments with multiple endpoints.

BACKGROUND

In the transition to increasingly digital environments, assets deemed worthy of protecting are similarly increasingly digital. For example, a contract, trade secret, etc., once stored in physical location, may increasingly be digitized.

The increased use of digital environments has made maintaining related security systems more expensive, more complex, and harder to maintain over time. In addition, security systems for the digital environments should be timely, and be able to act on demand since users are not likely to appreciate undue delays to access documents which are relied upon for operations.

In addition to the challenge of managing the sheer scale of digital assets and related security systems, the digital environment may be partitioned, leading to further complications. For example, different service providers can manage different aspects of a digital environment, and partitions may be unable to cooperate with one another, or partitions may impose requirements that effectively put the various partitions at odds with one another. For example, in the current cloud landscape, providers include their own proprietary authentication and authorization service solutions, while third-party application vendors like Databricks™ certify and provide their own products for partial integration with the cloud provider's eco-system. Those systems and services do not necessarily adhere to cloud provider authentication and authorization architecture. Cloud tenants also have custom application systems and services that might not fully integrate into cloud provider eco-systems. Identity and Access Management (IAM) is an important security controls that every organization needs to adhere to. The life cycle of an identity (Role) and a record of its history is also important.

Implementing and maintaining systems to manage access in digital environments in a robust, scalable, efficient, manageable, adaptable, resource friendly (e.g., expertise, cloud computing requirements, etc.), relatively inexpensive manner is desirable.

BRIEF DESCRIPTION OF THE DRAWINGS

Embodiments will now be described with reference to the appended drawings wherein.

DETAILED DESCRIPTION

Figure 1:
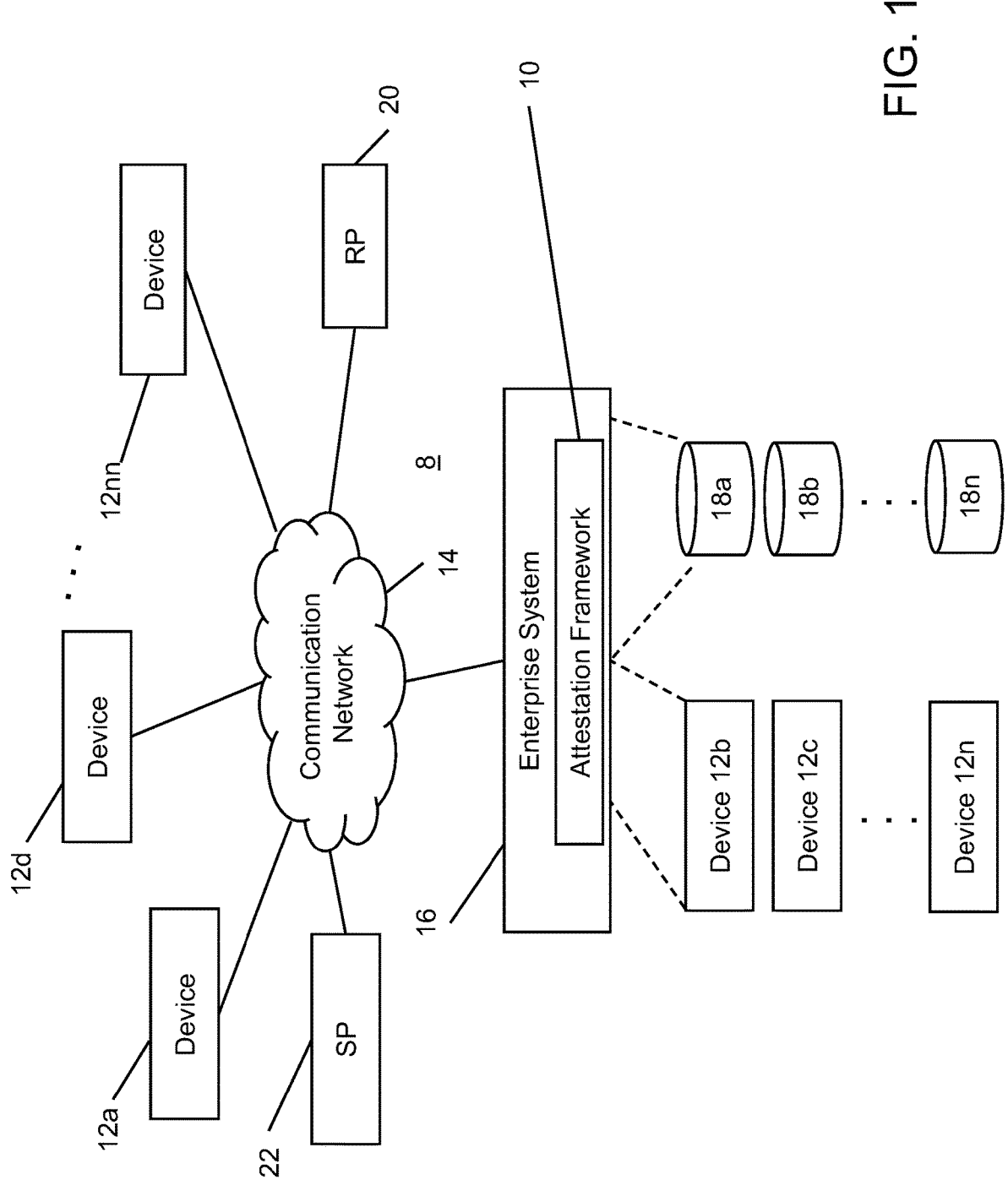
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It is understood that the use of the term "data file," also referred to as a "data element" is not intended to be limited solely to individual data files, and that an expansive definition of the term is intended unless specified otherwise. For example, the data file can store information in different formats, can be stored on different media (e.g., a database, a portable data stick, etc.). The data file may not necessarily be an independent file, and can be part of a data file, or include a routine, method, object, etc.

This disclosure relates to an attestation framework. In one example, the attestation framework can include a multi-process attestation client that includes a Python-based application framework that provides capabilities needed by a service owner to develop attestation for their services. The disclosed attestation framework can be part of a suite of applications that automatically provides a check for role identity and role access, allowing automated pipelines to identify needs for a role to exist in the end-point system. These automated pipelines can provision and de-provision an identity and its authorization/entitlements.

The attestation framework can be a loosely coupled framework written in the Python language. The attestation framework can utilize upstream and downstream services to provide the necessary hooks for the third-party developers to deliver attestation metadata to the downstream consumer. The attestation framework may rely in part on queuing theory and principles.

The disclosed attestation framework can produce and transfer an indigestible payload (e.g., an XML payload) to the downstream service. Previous approaches included the use of a rigid schema (e.g., an XSD schema) which created unnecessary client attestation work. The disclosed attestation framework can be self-contained and self-describing schema for consumption of the payloads, so that a client that collects and processes service metadata is not forced to change that data to satisfy constraints of the downstream attestation (in this case, DIAMOND) architecture. Some previous approaches could also result in a loss of accuracy.

Some previous approaches operated in an environment with micro-segmentation and region access restrictions which forced attestation process architecture to become a staged process. Addressing this type of tenant-imposed restriction may require a logical framework to define operational model execution per region and to collect attestation metadata to only one region for final processing.

Some previous approaches suffered from an inability to utilize functional account details from an authoritative or golden source. Consuming second-hand filtered information from the cloud pipeline process through the REST API calls resulted in these approaches being slower to retrieve functional account attributes, the loss of information, increased overhead of processing, and heavy handling of possible multipoint failures in code base.

Some previous approaches included mismatched RBAC (Role Based Access Control) design for certain third-party cloud services and forced these previous frameworks to provide several different approaches to obtain the metadata.

The proposed attestation process can be configured to embrace metadata as close as possible to a natural state in the system-a raw view. Downstream clients may be able to use ETL (Extract Translate Load) processing, filtering, and presenting metadata for downstream attestation purposes.

This disclosure relates to a device and method to manage accessing digital resources. Illustratively, the method includes generating a first set of tasks to generate fragmented objects, and a second set of tasks to normalize the fragmented objects. The tasks can be added to a queue (e.g., run according to FIFO), which is managed by a task manager to control a worker node ingestion rate to ensure timely processing of the fragmented objects for normalization. The objects can be lists of access controls, and the method can enable timely servicing of third party applications, or other downstream services, of normalized data to validate attestations. As a result of the fragmentation of the objects, the method includes controlling the queue to ensure that worker nodes can process the objects in a timely manner, and the task manager can control the worker nodes to vertically or horizontally scale the process to increase performance, or to increase utilization of available resources.

The disclosed method also includes an approach for normalizing the objects to reduce them, thereby increasing the timeliness of serving the normalized data. The approach can include manipulating the objects to flatten the metadata, to split data according to the type of permission the record relates to (e.g., files vs folder permissions), enforce uniformity on the split data, and thereafter to join the split data and retain records to satisfy uniqueness criteria. In one example, the uniqueness criteria include unique combinations of path, group, and access right, and experimental testing indicates that the approach can reduce the amount of metadata that needs to be processed by greater than 90%.

In one aspect, there is provided a device for managing digital access. The device includes a processor, a communications module coupled to the processor, and a memory coupled to the processor. The memory stores computer executable instructions that when executed by the processor cause the processor to generate a first set of tasks to retrieve a plurality of target properties from a data element as a plurality of fragmented objects. The instructions cause the processor to assign the first set of tasks to a queue, a plurality of nodes performing tasks in the queue, and automatically generate a second set of tasks to process the plurality of fragmented objects from a first data structure into a normalized data structure. The instructions cause the processor to assign the second set of tasks to the queue. At least some nodes of the plurality of nodes configured to normalize a respective fragmented object associated with a task of the second set of tasks into the normalized data structure, and update the queue in response to completing normalization for the respective fragmented object. The instructions cause the processor to generate a third task to generate a final normalized data structure for the data element, and generate the final normalized data structure by aggregating the normalized fragmented objects processed by the nodes.

In example embodiments, the instructions cause the processor to normalize the respective fragmented object by removing records from the fragmented object which do not include target access permissions, removing records from the fragmented object based on whether they satisfy one or more uniqueness criteria, and generating the normalized data structure based on the updated fragmented object. In example embodiments, the one or more uniqueness criteria include at least a combination of a file path, group, and target property. In example embodiments, the instructions cause the processor to remove records from the fragmented object based on whether they satisfy one or more uniqueness criteria. The records are removed by manipulating from the fragmented object from the first data structure into a second data structure where each of the one or more uniqueness criteria are a separate column, and parsing the manipulated fragmented object to remove duplicate. In example embodiments, the instructions cause the processor to manipulate the fragmented object into the second data structure by splitting the fragmented object into separate data frames. For each split data frame being, records are manipulated to ensure each of the one or more uniqueness criteria are a separate column. The fragmented object is populated into the second data structure by aggregating the split data frames, where records in the first data structure are updated to include entries for the uniqueness criteria in the second data structure.

In example embodiments, the data element is one of a plurality of data elements, and wherein, to normalize the respective fragmented object for each of the enterprise partitions, the instructions cause the processor to determine a data model associated with the enterprise partition, wherein the data model enables conversion from the first data structure of the enterprise partition into the normalized data structure, and normalize the respective fragmented objects with the determined data model.

In example embodiments, the instructions cause the processor to provide the final normalized data structure to an attestation service, and enable the attestation service to grant access permissions in response to requests to access one of the at least one data element.

In another aspect, a method for managing resources for access regimes is disclosed. The method is executed by a device having a communications module and includes generating a first set of tasks to retrieve a plurality of target properties from a data element as a plurality of fragmented objects, and assigning the first set of tasks to a queue. A plurality of nodes performing tasks in the queue. The method includes automatically generating a second set of tasks to process the plurality of fragmented objects from a first data structure into a normalized data structure. The method includes assigning the second set of tasks to the queue. At least some nodes of the plurality of nodes are configured to normalize a respective fragmented object associated with a task of the second set of tasks into the normalized data structure. The method includes updating the queue in response to completing normalization for the respective fragmented object. The method includes generating a third task to generate a final normalized data structure for the data element, and generating the final normalized data structure by aggregating the aggregating the normalized fragmented objects processed by the nodes.

In example embodiments, the first and second set of tasks are dynamically generated based on a static scanning task to identify the plurality of target properties of the data element.

In example embodiments, each of the plurality of fragmented objects is limited to a target size, and an amount of the first set of tasks is based on the target size and a number of the plurality of target properties.

In example embodiments, normalizing the respective fragmented object includes removing records of the first data structure which do not include target access permissions, removing records of the first data structure based on whether they satisfy one or more uniqueness criteria, and generating the normalized data structure based on the resulting first data structure. In example embodiments, the one or more uniqueness criteria include at least a combination of a file path, group, and target property.

In example embodiments, removing records of the first data structure based on whether they satisfy one or more uniqueness criteria includes manipulating the first data structure into a second data structure where each of the one or more uniqueness criteria are a separate column, and parsing the second data structure to remove duplicate records based on the manipulated first data structure. In example embodiments, manipulating the first data structure into the second data structure includes splitting the first data structure into separate data frames, and for each split data frame being, manipulating records to ensure each of the one or more uniqueness criteria are a separate column. The method includes populating the second data structure by aggregating the split data frames, where records of the first data structure are updated to include entries for the uniqueness criteria.

In example embodiments, the one or more data models specify a target size of the plurality of fragmented objects.

In example embodiments, the one or more data models defines allowable states of the first and second set of tasks, with tasks only permitted to transition between allowable states.

In example embodiments, the one or more data models specify criteria based on an ingestion rate of tasks by the plurality of nodes, a task manager controlling the tasks assigned to the queue based on the criteria.

In example embodiments, the method further includes retrieving, by the plurality of nodes, tasks from the queue based on a first in first out methodology.

In example embodiments, the method further includes providing a processing monitor, determining, by the processing monitor, that a node of the plurality of nodes has a threshold amount of processing capacity, and deserializing the at least some of the plurality of fragmented objects associated with first set of tasks to create a larger task, the larger task based on the threshold amount of processing. The method includes assigning the larger task to the node.

In example embodiments, the second set of tasks include, for each data element, creating an intermediary data element that complies with the data model size requirements, and standardizing the intermediary data element into the normalized data structure by enforcing a linearity criterion of the data model. In example embodiments, the intermediary data element is generated based on a pre-defined template.

In another aspect, a non-transitory computer readable medium for managing resources for access regimes is disclosed. The computer readable medium includes computer executable instructions for performing the above recited method aspect.

Referring now to the figures, FIG. 1 illustrates an example of a computing environment 8. The computing environment 8, as shown, includes one or more devices 12, a source of data elements, such as the shown datastore 18, a remote platform 20, a service provider 22, and a communications network 14 connecting one or more components of the computing environment 8.

Client device 12 may be associated with one or more users. Users may be referred to herein as employees, customers, clients, consumers, correspondents, or other entities that interact with the enterprise system 16 and/or attestation framework 10 (directly or indirectly). The computing environment 8 may include multiple client devices 12, each client device 12 being associated with a separate user or being associated with one or more users. In certain embodiments, a user may operate client device 12 such that client device 12 performs one or more processes consistent with the disclosed embodiments. For example, the user may use client device 12 to engage and interface with the attestation framework 10 as well as mobile or web-based applications provided by the enterprise system 16, which is provided within, or is complementary to, the attestation framework 10. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12, enterprise system(s) 16, and/or attestation platform(s) 10. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

In one embodiment, attestation framework 10 may be one or more computer systems configured to process and store information and execute software instructions to perform one or more processes consistent with the disclosed embodiments. In certain embodiments, although not required, attestation framework 10 may be associated with one or more business entities. In certain embodiments attestation framework 10 may represent or be part of any type of business entity. For example, the attestation framework 10 may be a system associated with a commercial bank (e.g., enterprise system 16), a digital media service provider, or some other type of business which performs data analyses (e.g., a cloud computing provider). The attestation framework 10 can also operate as a standalone entity that is configured to serve multiple business entities.

The attestation framework 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the attestation framework 10 and/or enterprise system 16. The cryptographic server may be used to protect, for example, the datastore 18 and/or the datafile on which security is being performed, etc., by way of encryption for data protection, digital signatures or message digests for data integrity, and by using digital certificates to authenticate the identity of the users and client devices 12 with which the enterprise system 16 and/or attestation framework 10 communicates to inhibit data breaches by adversaries. It can be appreciated that various cryptographic mechanisms and protocols can be chosen and implemented to suit the constraints and requirements of the particular deployment of the attestation framework 10 or enterprise system 16 as is known in the art.

The computing environment 8 can also include an enterprise system 16 (e.g., a financial institution such as commercial bank and/or insurance provider) that provides services to users (e.g., processes financial transactions). The services generate, cause the enterprise system 16 to come into possession of, or be responsible for the storage of data elements. The data elements or related processes can be stored within enterprise system 16 operated databases, such as the shown databases 18a, 18b, to 18n. Similarly, the data elements or related processes can be stored in devices 12b, 12c, to 12n, controlled by the enterprise system 16, or stored in devices remote to the enterprise system 16 but with access thereto, such as the shown devices 12a, 12d, to 12nn. The data elements can be stored remote to the system 16 on devices or platforms that provide services to the enterprise system 16, such as the shown as remote platform(s) 20.

The enterprise system 16 can utilize one or more services provided by the remote platform 20, or the service provider 22. For example, the remote platform 20 can be a platform of cloud service providers. The service provider 22 can provide services to the enterprise system 16 that may or may not be related to the remote platform 20. For example, the service provider 22 can require access to enterprise system 16 assets stored on the remote platform 20, or can perform various audit-related tasks that require access solely to the enterprise system 16, etc.

It is understood that while the enterprise system 16, the remote platforms 20, and the service provider 22 are shown as separate entities, the remote platforms 20, and the service provider 22 can be integrated at least in part with the enterprise system 16. For example, at least some of the functions of the enterprise system 16 can be performed on a combination of the enterprise system 16, the remote platforms 20, and/or the service provider 22. Further particularizing the example, the enterprise system 16 devices 12b, 12c, to 12n can be virtual devices hosted on the remote platform 20.

The enterprise system 16 can include different components, which components have been omitted from FIG. 1 for clarity. Some of the potential components are discussed in FIG. 8, below, with additional detail.

The datastore 18 (referred to generally for ease of reference) stores the data elements and related processes. The data elements and related processes can include team, intranet, messaging, committee, or other client—or relationship-based data. The data elements and related processes can be data that is not controlled by certain processes within an enterprise system 16, or otherwise (e.g., enterprise system 16 generated data). For example, the data elements and related processes can include information about third party application (relative to enterprise system 16) used by employees, such as human resources, information technology (IT), payroll, finance, or other specific application. The data elements and related processes in the datastore 18 may include data associated with a user of a device 12 that interacts with the enterprise system 16 (e.g., an employee, or other user associated with an organization associated with the enterprise system 16, or a customer, etc.). The data elements and related processes can include customer data associated with a device 12, and can include, for example, and without limitation, financial data, transactional data, personally identifiable information, data related to personal identification, demographic data (e.g., age, gender, income, location, etc.), preference data input by the client, and inferred data generated through machine learning, modeling, pattern matching, or other automated techniques. In at least one example embodiment, the data elements and related processes includes any data provided to a financial institution which is intended to be confidential, whether the data is provided by a client, employee, contractor, regulator, etc. The data elements and related processes in the datastore 18 may include historical interactions and transactions associated with the attestation framework 10 and/or enterprise system 16, e.g., login history, search history, communication logs, documents, etc.

The enterprise system 16 can manage data element storage on the basis of endpoints. For example, referring to FIG. 1, the shown enterprise system can use different devices to store data elements for each endpoint. Continuing the example, the device 12b can be an endpoint for a credit card department, and store related data elements, the device 12c can be an endpoint for an insurance unit, and store related data elements, etc. That is, the different endpoints can store their respective data elements, and the endpoint can control the organizing principles used to store the associated data elements.

The enterprise system 16 uses an attestation framework 10 for managing access to the data elements and related processes. The attestation framework 10 can have access to various different data or tools. The attestation framework 10 can be a standalone platform (not shown), a third-party platform used by the enterprise system 16, or a process or program embedded in other applications that interact with the enterprise system 16. For example, the attestation framework 10 can have access to the remote platforms 20, or services 22, to retrieve criteria or templates used to access different endpoints, to manage resources for enabling digital access, to retrieve data elements and related processes for such purposes (e.g., from one or more enterprise system 16 endpoints). For example, in the shown embodiment, the enterprise system 16 can store data elements on the remote platform 20 and require the stored data elements for use with the services of the service provider 22. The service provider 22 can require an attestation from the attestation framework 10 in order to be able to access the relevant data elements, and the remote platform 20 can require the attestation from the attestation framework 10 to provide access to the relevant data elements to the service provider 22. In another example, the attestation framework 10 can require access to resources of the remote platform 20 to generate an attestation for the service provider 22. The remote platform 20 can provide additional computing resources, which additional resources the attestation framework 10 can use to generate the necessary attestation (e.g., as will be discussed in greater detail, to normalize access permission data for the service provider 22).

The attestation framework 10 can be an application that utilizes upstream services (e.g., remote platform 20) and downstream services (e.g., service providers 22) to provide the necessary interfaces for third-party developers to deliver attestation metadata to a downstream consumer. The attestation framework 10 can produce and transfer a normalized data structure (e.g., an indigestible XML payload) for the downstream service (service provider 22).

Figure 2:
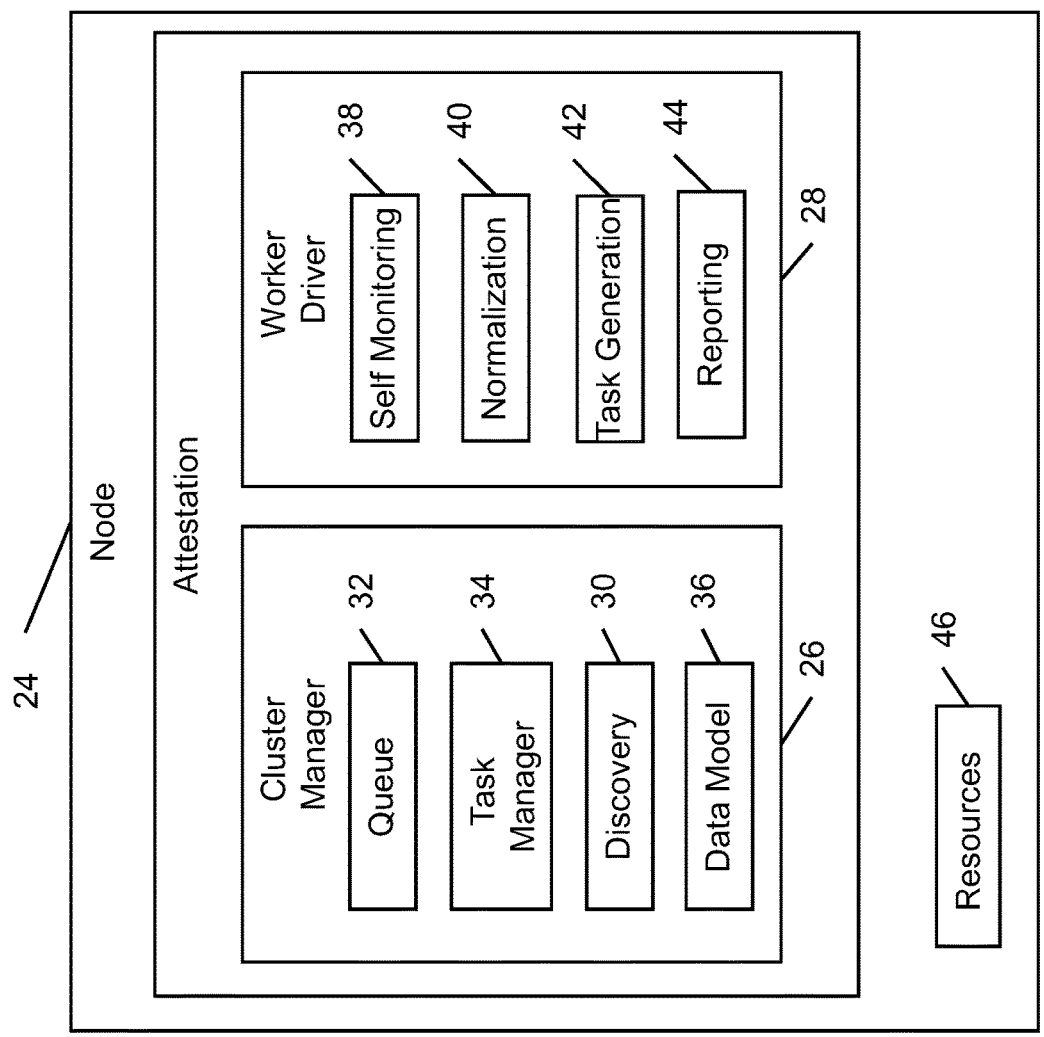
FIG. 2 is a block diagram of an example node.

Referring now to FIG. 2, a block diagram of example node 24 is shown. The example node 24 can be instantiated on a physical device of the enterprise system 16 (e.g., device 12a of FIG. 1), or on the remote platform 20, etc. It is understood that while a single node 24 is shown, a plurality of nodes is contemplated.

The node 24 includes instances of at least part of the attestation framework 10. For example, each node 24 can include portions of the attestation framework 10 that enable a multi-step servicing process. The same attestation framework 10 code base can perform two different roles, or act as different cluster entities; a cluster manager 26 and worker driver 28 (also referred to as a worker driver). The cluster manager 26 can coordinate the operation of a plurality of nodes 24 directly, or indirectly (e.g., via controlling the flow of tasks to a queue 32). The cluster manager 26 can be embedded in the attestation framework's code, with the framework 10 using the DRY principle of software development.

The cluster manager 26 can include a discovery service 30. The discovery service 30, which can be an automated service, can scan and generate a container of objects representing identified data elements of a plurality of endpoints (alternatively referred to as End Point Services, or EPS) of the enterprise system 16. The identified data elements can be access control log target properties of the endpoint. That is, the discovery service 30 can be used to discover the presence of access controls on the endpoints, identify associated manifests, etc.

Despite the potentially infinite number of EPSs, delivering all EPS as a single point catalog can be a manageable volume of information. The discovery service 30 can generate a plurality of container objects based on the identified manifests. These container objects can be light and equal to an initial setup of workflows (to further explore the identified endpoints). The discovery service 30 can generate tasks for a workflow to process the identified and scanned workflows. The workflows generated by the discovery service 30 may be referred to as a Work Flow Queue, or "WFQ".

In example embodiments, the discovery service 30 is configured to use EPS manifests supplied by an inventory scan of the EPS to generate the WFQ. That is, the EPS manifests supplied with the inventory scan (which scan can be performed by the discovery service 30, or more generally by the cluster manager 26) can enable the cluster manager 26 to implement subsequent dynamic workflow management of worker node 24 processing, as discussed herein.

The cluster manager 26 can provide the generated tasks of the WFQ a queue 32. The queue 32 can be configured to receive notifications of tasks or reports from the cluster manager 26, to notify the cluster manager 26 of completed tasks, etc. The queue 32 can be hosted on a remote platform or database, such as platform 20, on a device on which the cluster manager 26 is instantiated, etc. The queue 32 can be configured to push, or to respond to requests for tasks from the worker nodes 24. The queue 32 can respond to push tasks in a first in first out methodology, or other methodologies.

The cluster manager 26 can include a task manager 34 for assigning tasks to the queue 32, or to configure the queue 32's behavior in response to worker nodes 24.

The worker driver 28 can retrieve (or be provided with) one or more WFQ tasks from the queue 32 for completion. For example, one task of the WFQ can include the worker driver 28 retrieving the related data elements from the EPS.

In example embodiments, the WFQ task includes the task of generating dynamic tasks (e.g., workflows/tasks that modify themselves or create new workflows/tasks based on execution of the discovery service 30, or other modules) based on the completion of the WFQ task. For example, a task can include the worker driver 28 triggering the task generator 42 to fragment the data element into a plurality of fragments based on a data model 36. The task generator 42 can be configured in accordance with the data model 36. In another example, the task generator 42 generates one or more dynamic tasks to normalize fragmented data elements, that aggregate the fragmented data elements, etc.

The task generator 42 can drive the dynamic workflows through the use of templates (e.g., the normalization templates discussed herein).

The task manager 34 can manage the one or more dynamic workflows. For example, the task manager 34 can be used to control the flow of tasks to the queue 32, or the response times of the queue 32 in response to requests from the nodes 24, or to parameters of the nodes 24 that change parameters of the node 24 (e.g., vertically scale to use more memory) or the composition of the plurality of nodes 24 (e.g., horizontal scaling the number of nodes to perform a task).

The task manager 34 can stage the dynamic workflow for work according to the following formula:

$$\text{AutoD} = WFQ > \{WN_1, WN_2, \ldots, WN_n\} < \text{DWFQ}$$

Auto Discovery (AutoD) in the above formula represents the size of objects being processed and can be used to control the discovery service 30 (e.g., the discovery service can be suspended when the AutoD value is too large, etc.). AutoD can be equal to the initial state of workflows which is equal to WFQ using a FIFO (First In, First Out) access pattern. The WFQ can be used by horizontally scaling worker node (WN) harnesses. The scaling of the worker node harnesses can be undetermined at start of processing, but less than a WFQ or DWFQ (Dynamic Workflow Queue). Initial processing of manifests by worker nodes produces the dynamic workflow queue (DWFQ). The DWFQ can be generated according to a (FIFO) access pattern. The DWFQ can be significantly larger than original the WFQ if the data elements are segmented or fragmented for processing (e.g., the data elements include a target property of ACL payloads, and the data elements are segmented into data frames which are limited by a 2 GB size boundary). In example embodiments, a separate task manager 34 is used to maintain the WFQ and the DWFQ.

The task manager 34 can manage tasks based on one or more processing criteria. The processing criteria can include parallel processing criterion, timeliness criterion, etc.

The processing criteria can include a workflow percent growth rate. For example, a workflow percent growth rate for a cloud storage eco-system could be expressed as:

$$GR = \frac{((B-x) + x*NB) - (A=B)}{(B-x) + x*NB}$$

The value B can represent a number of tasks in a WFQ, the value A can represent the number of data elements (e.g., endpoints) that have been discovered to process. The variable 'NB' in the above formula represents the number of workflow tasks required to be completed processing the known data elements. The value x represents the number of storage points being processed.

In example embodiments, the above formula determines that in an example of 100 EPS data elements, depicted as "A," and a number of WFQ workflows "B" will be an equal number.

The growth rate of the DWFQ queue after initial storage manifest discovery can increase, potentially dramatically. For example, if x=10 storage points of the discovered 100 EPS's have each NB=200 tasks (e.g., 200 tasks to normalize fragmented data elements of ACL files, alternatively referred to as chunks), the attestation framework 10 can create a DWFQ of 10*200+90=2090 workflows with the queue growth rate percentage of GR=95.21% in a brief period. To process these types of multi-level feedback queues, each worker node24 can be configured to process both WFQ and DWFQ in the FIFO schedule. To remedy any type of queue-level dependencies without creating multi-level queues, the attestation framework 10 can employ a full FIFO queue exchange, effectively purging the initial WFQ in the queue 32 and substituting it with a newly discovered DWFQ.

The processing criteria can include a measure based on Little's law. That is, the processing criteria can include a criterion based on the relationship between a distribution rate of Poisson processes and time spent delivering results through the cluster of work nodes. For example, the relationship can be defined by:

$$L = \lambda W$$

The average number of discovered workflows is calculated with an arrival rate (A) multiplied by the average worker nodes' time for processing a workflow/task (W). Workflows arrive from the cluster manager 26 from a discovery service 30 payload at a burst rate. The size of workflows is undetermined at the start, but the processing queue 32 for the purpose of attestation is unlimited in capacity. For example, considering that the rate of submitted workflows in a queue 32 is 10/min, and an average worker node 24 processing time of 1 minute, the average number of workflows at any time will be 10 (L=10*1=10). The described relationships deal with the mathematical theory of probability and are used to describe models of distribution in computation and logistics.

In example embodiments, the attestation framework 10 can be configured to exclusively deal with the processing criteria based on the above described Poisson processes, and use the cluster manager 26 and queue 32 in a manner where the worker nodes 24 ingestion rate is strictly controlled (e.g., the ability to push workflows to the worker nodes 24, or the ability to respond to pull requests by the worker nodes 24, etc.). In this example, the worker nodes 24 ingestion rate can be definable and stable time wise.

In example embodiments, the attestation framework 10 can be configured with various thresholds for the different processing criteria. For example, the task manager 34 can prevent the discovery service 30 from continuing when the queue growth rate reaches a certain threshold (e.g., the growth rate is so large so as to prevent timeliness in responding), the ingestion rate of the worker nodes, etc.

The attestation framework 10 can be configured to adhere to a data model 36. The data model 36 can impose a Markov chain workflow model. The model 36 can be coded into the cluster manager 26, as shown, or remote to the cluster manager 26, or accessed by the worker node 24 via the cluster manager 26, etc. The data model 36 can describe a sequence of events whose probability depends on the state attained in a previous event. The data model 36 can define and estimate future and past states of processes to ingest data elements with the attestation framework 10. For example, the data model 36 can define the following four (4) states: ready, fizzled, running and complete. Ready can indicate that the workflow is ready to be consumed. Fizzled can indicate that a task and workflow raised an error and failed. Running can indicate that a workflow is being processed, and complete can indicate that a workflow successfully completed.

The future and past states can be defined as being independent, such that what happens tomorrow depends on today's state. For example, initially the attestation framework 10 can have a small WFQ in queue 32, upon completion of the discovery service 30. Both WFQ and DWFQ in the queue 32 can be continuously monitored, for example to determine and track workflows based on the four workflow states.

The model 36 predictions can be used to predict processing criteria. For example, the model 36 can be used to predict a model growth rate, the ingestion rate of the worker nodes 24 given the state of the queue 32, etc.

The timeliness criteria can be a criterion required to meet service levels. For example, the timeliness criteria (e.g., process within a day) can be received from an external input, set as a configuration, etc. The timeliness criteria can be used to impact the ingestion rate (e.g., the number of horizontally scaled worker nodes 24, or the parameters of a worker node 24, can be scaled to satisfy an ingestion rate that is acceptable).

One approach to address timeliness can include the task manager 34 determining whether to increase or decrease the fragmentation of tasks to different worker nodes. For example, a processing monitor (not shown) of a task manager 34 can aggregate various tasks of a workflow into a larger workflow task, or vice versa. More generally, the attestation framework 10 can implement timing decorators across the code base, in every node 24. The task manager 34 can thereafter be configured with, or receive from an external source (e.g., data model 36) processing monitor criteria. For example, the criteria can be defined at least in part by:

$$\frac{WF(1)}{T(1)} = \frac{NQ}{p * T(p)} \rightarrow p = \frac{T(1)}{WF(1)} * \frac{NQ}{T(p)}$$

Where T (p)=total wall-clock time to process NQ in full, NQ is the total number of available dynamic workflows, T (1) is a wall-clock time for 1 workflow execution, WF (1) is one workflow payload (e.g., one storage ESP (End Service Point) payload (2 GB chunk)), and p is a number of worker nodes.

Figure 10:
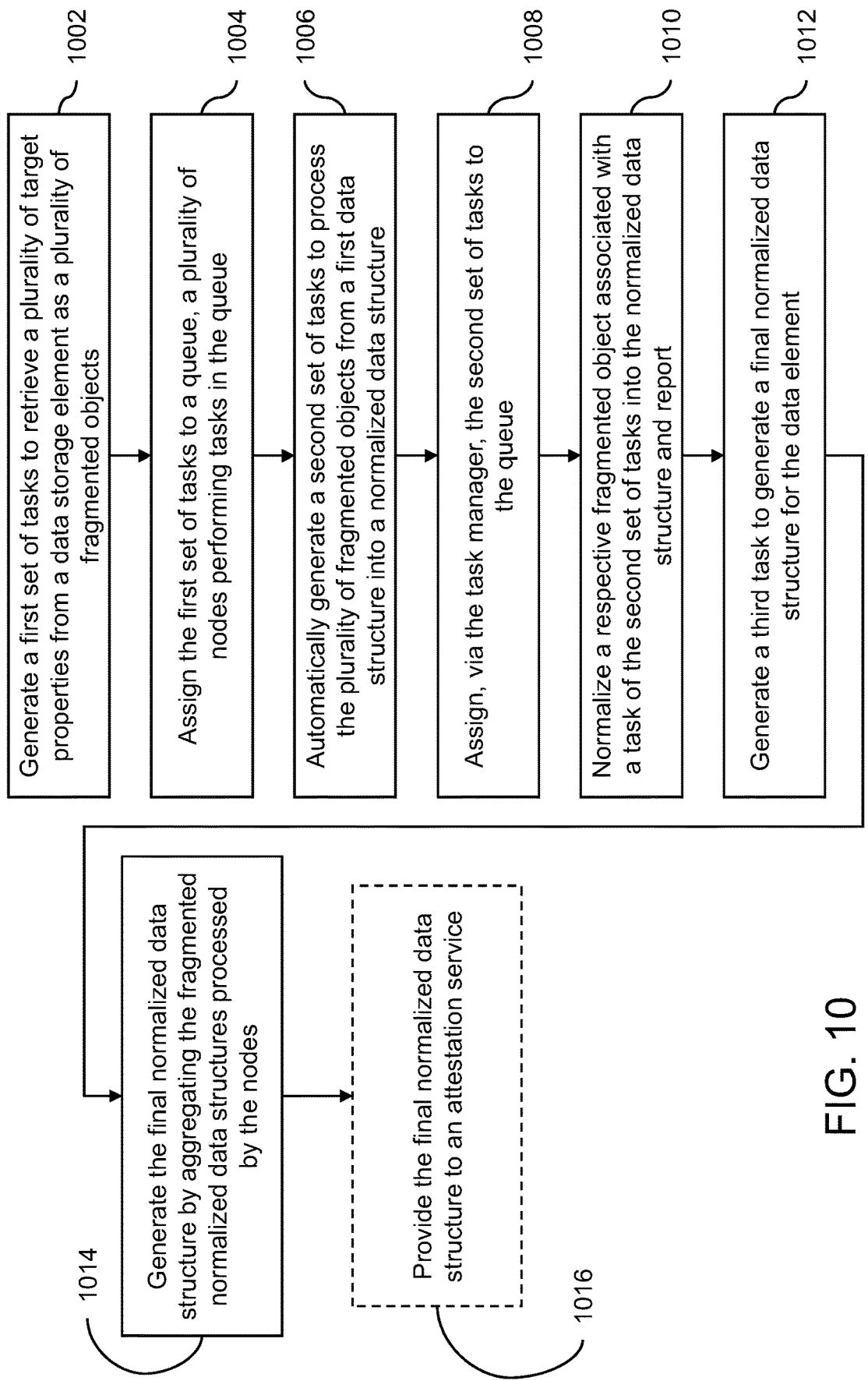
FIG. 10 is a flow diagram of an example of computer executable instructions for processing hierarchical data.
Figure 11:
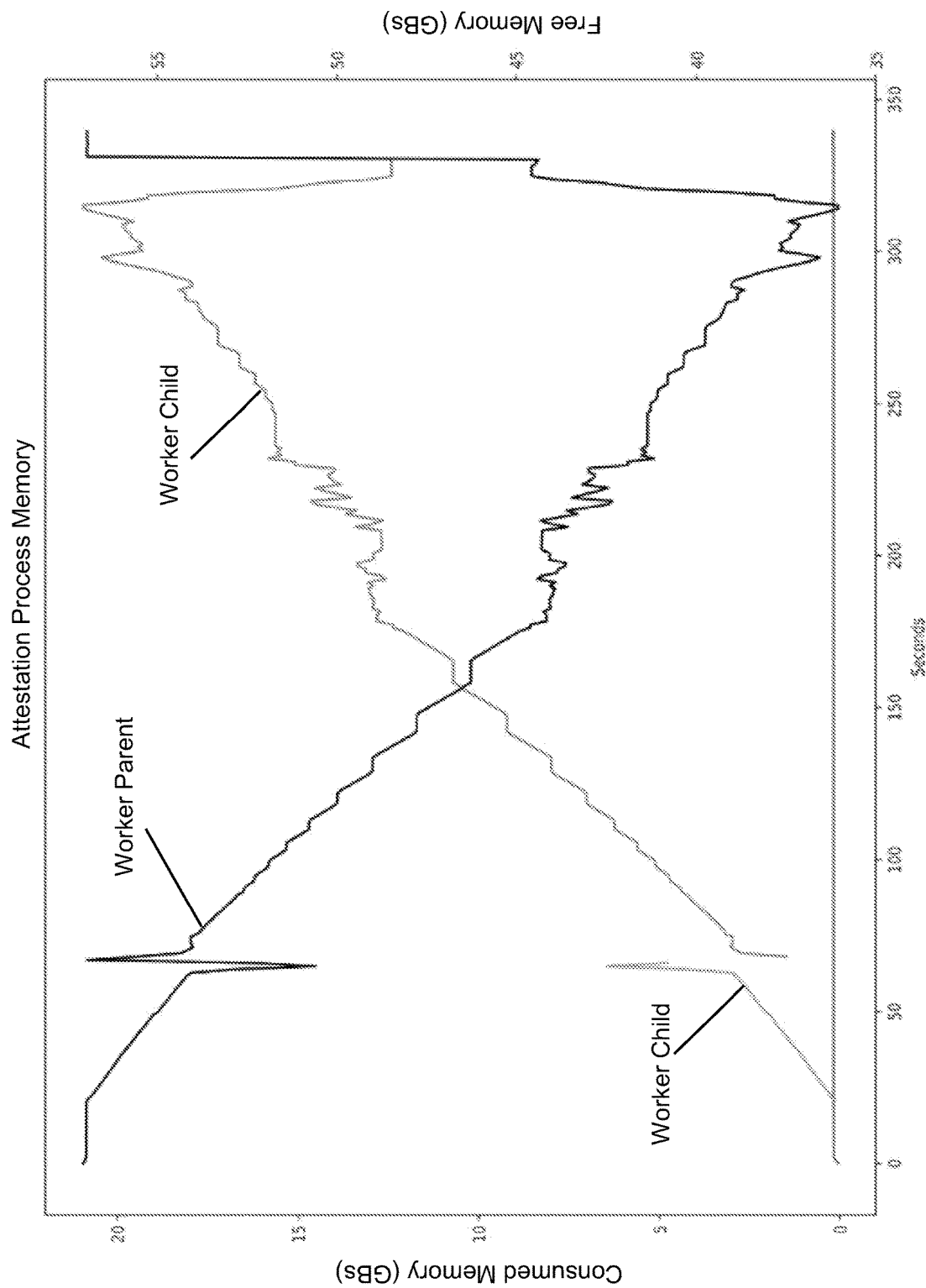
FIG. 11 is a graph of experimental results.

In an example, through testing, the serial processing time for one workflow (e.g., a 2 GB payload) processed on one worker node 24 was found to be approximately 10 minutes. This time can be understood as sequential time for processing. The number of available dynamic workflows was 2090. The input total wall-clock time (e.g., a timeliness criterion) was 20 hrs. Using that example, the number of worker nodes 24 was found to be approximately ~10-12 worker nodes. That is, 10-12 worker nodes would successfully process 2090 workflows of comparable size within a 20-hour time-boxed environment. Note that WF (1) may vary by size but that the limit of one payload can be set to not exceed a size boundary (e.g., an ACL file cannot exceed the 2 GB limit), so as to increase vertical scaling, or transmission bottlenecks, etc. FIG. 10 shows the results of processing an example data element on memory of worker nodes 24.

A processing criterion can be based on Amdahl's Law, which can be used to define the single worker 24 node execution time as one unit of time:

$$F_s + F_p = 1$$

Serial work execution is defined as "Fs" and parallel as "Fp." Parallelization can occur even within one worker node system (multi core-multi-interpreter utilization).

In terms of execution speedup expressed as "S" could be expressed as a division of the execution time of one node Fs vs. n nodes Fp and this value can be greater than 1.

$$S = F_s + F_p/F_s = 1/F_s$$

If the framework 10 takes 180 seconds (about 3 minutes) to run and 50% of work can be serialized, then the upper bound, speed wise, of the framework 10 to finish the tasks will be approximately 90 seconds (about 1 and a half minutes). The attestation framework 10 in the above-described example with 2090 workflows provides a speedup of ~ 10s for a 12 worker node 24 cluster:

$$S = \sim 10$$

To determine efficiency of cluster processing as CE:

$$CE = S/WN$$

Cluster efficiency of 0.83 (83%) achieved with 12 worker nodes will allow completion of ~2090 workflows daily. It is noted that this value could be as high as 1.

A sequential portion of the framework 10 execution time is unlikely to change. Thus, this limit will exist for any number of worker nodes 24 regardless of the speed-up achieved with horizontal worker node scaling.

The worker driver 28 can include a self-monitoring module 38 that monitors usage of computing resources 46 (CPU, RAM, etc.) of the node 24 on which the worker driver 28 is implemented.

The worker driver 28 can include a task generator 42, for generating the DWFQ. For example, upon discovery service 30 providing a list of directories, and target properties (e.g., ACL lists) of the endpoint, the task generator 42 can fragment and serialize the ACL lists into data objects for subsequent consumption by worker nodes 24. For example, the task generator 42 can generate, based on a configuration of the data model 36, tasks including a pre-defined size of data element fragments (e.g., 2 GB) for normalizing portions of the ACL logs discovered, and add the generated tasks to the queue 32.

Similarly, the task generator 42 can be used to generate sub-tasks or populate the dynamic tasks. For example, each task for normalizing pre-defined portions of the ACL logs can be fragmented into sub-tasks depending on the type of normalization. The task generation model 42 can consult the data model 36 to determine the sub-tasks required, their mapping, etc., and thereafter processes the tasks into sub-tasks (e.g., a transposition sub-task, a mapping onto a template task, etc.).

The worker driver 28 can also include a reporting module 44, which outputs the results of completed tasks by the worker node, the current performance of the node 24 (e.g., memory usage), etc. The reporting module 44 can also communicate with the cluster manager 26 and/or other worker nodes to determine a next step to complete a task to avoid duplication.

Figure 3:
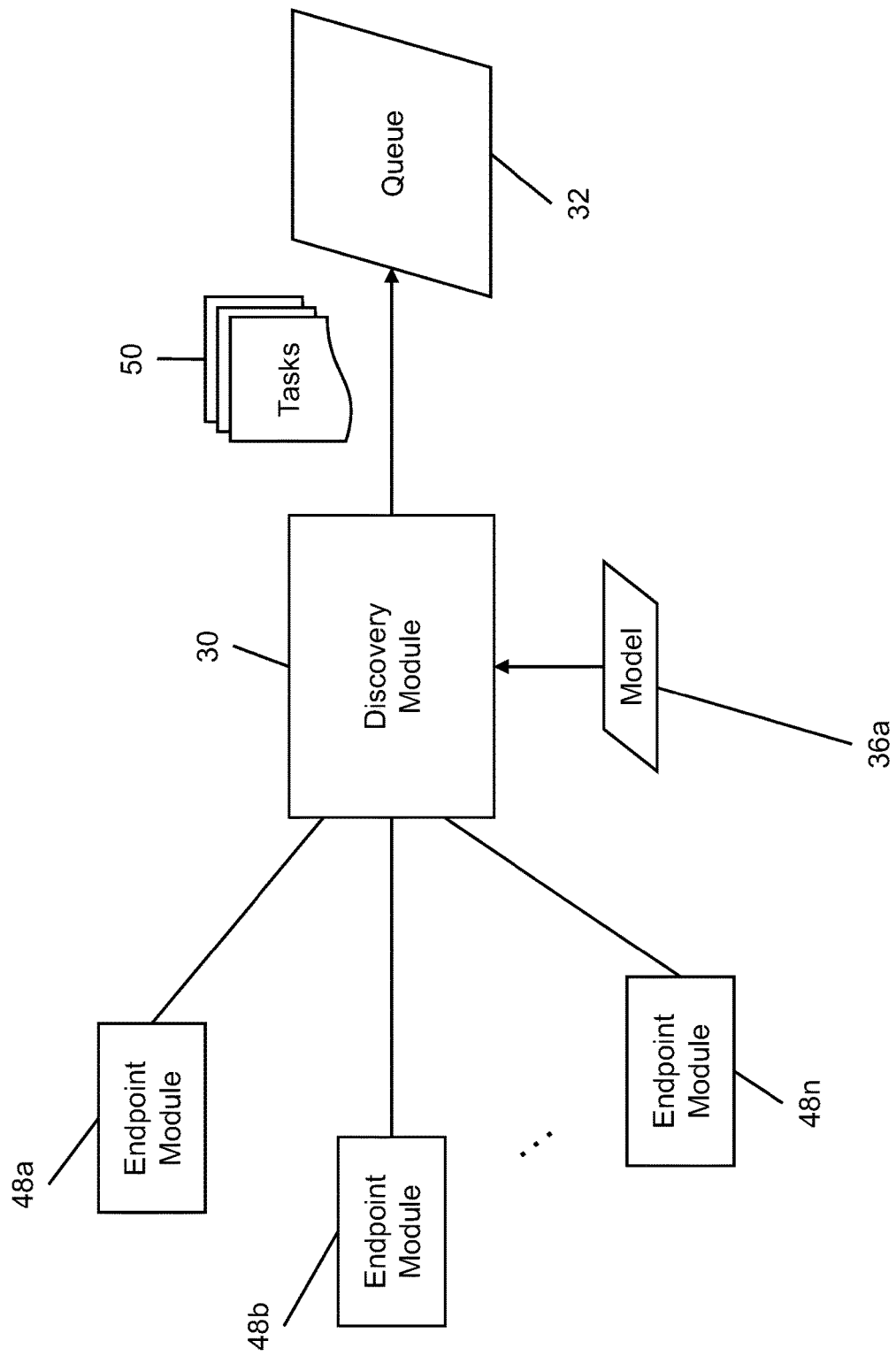
FIG. 3 is a block diagram of an example process for generating tasks.

Referring now to FIG. 3, an example block diagram for generating a workflow queue is shown.

Endpoint modules 48 can be used to provision a plurality of data elements, each for a plurality of endpoints, to a discover service 30. The modules 48 can interact with the discover service 30 to enable it to scan the endpoint, to discover the target properties. The endpoint module 48 can store a manifest of the relevant target properties (e.g., ACLs) that comprise the data elements to simplify scanning by the discovery service 30. In the shown embodiment, a plurality of enterprise endpoints is shown configured with a respective plurality of enterprise endpoint modules 48a, 48b . . . 48n.

A cluster manager 26, via a discovery module 30, interacts with the enterprise endpoint modules 48 to generate a plurality of tasks 50 (e.g., one container task for each of the data elements discovered on the endpoints 48). The tasks 50 can include tasks to have the worker nodes 24 retrieve the relevant data elements to a common file storage system, fragmenting the data elements, generating dynamic tasks to manipulate the data elements of the endpoint into a normalized data structure.

In example embodiments, the tasks 50 generated by the discovery module 30 are at least in part based on the data model, an aspect of which is shown as model 36a. For example, the model 36a can specify which target properties (e.g., access permissions, etc.) are to be discovered by the discovery module 30 (e.g., which properties are retrieved, and processed). The data model 36a can define the scope of discovery (e.g., certain positions of the endpoint can be designated as undiscoverable for security services, such as ensuring that third party applications are unable to access or know of certain sensitive assets). The data model 36 can be used to enforce classification of the discovered properties. That is, the retrieved data elements can be formatted in accordance with the data model 36 to maintain consistent representation of group names, consistent representation of access rights, etc. For example, the data model 36 can specify that the particular endpoint 48 provides individual names in the format of last name, first name. The model 36 can require worker nodes 24 to perform tasks to reformat the data element such that names are represented in the form of first name, last name. Similarly, the data model 36 can include parameters that specify how to access certain endpoints, syntax for communication with the particular endpoint, etc. In this way, the data models 36 can be used to ensure configurability of the framework 10 to interact with a plurality of different endpoints.

As alluded to above, and while not shown, it is understood that the task manager module 34 can be used to determine whether additional discovery is to be pursued, given the node 24 utilization.

The generated tasks 50 are added to the queue 32, for consumption by worker nodes 24.

Figure 4:
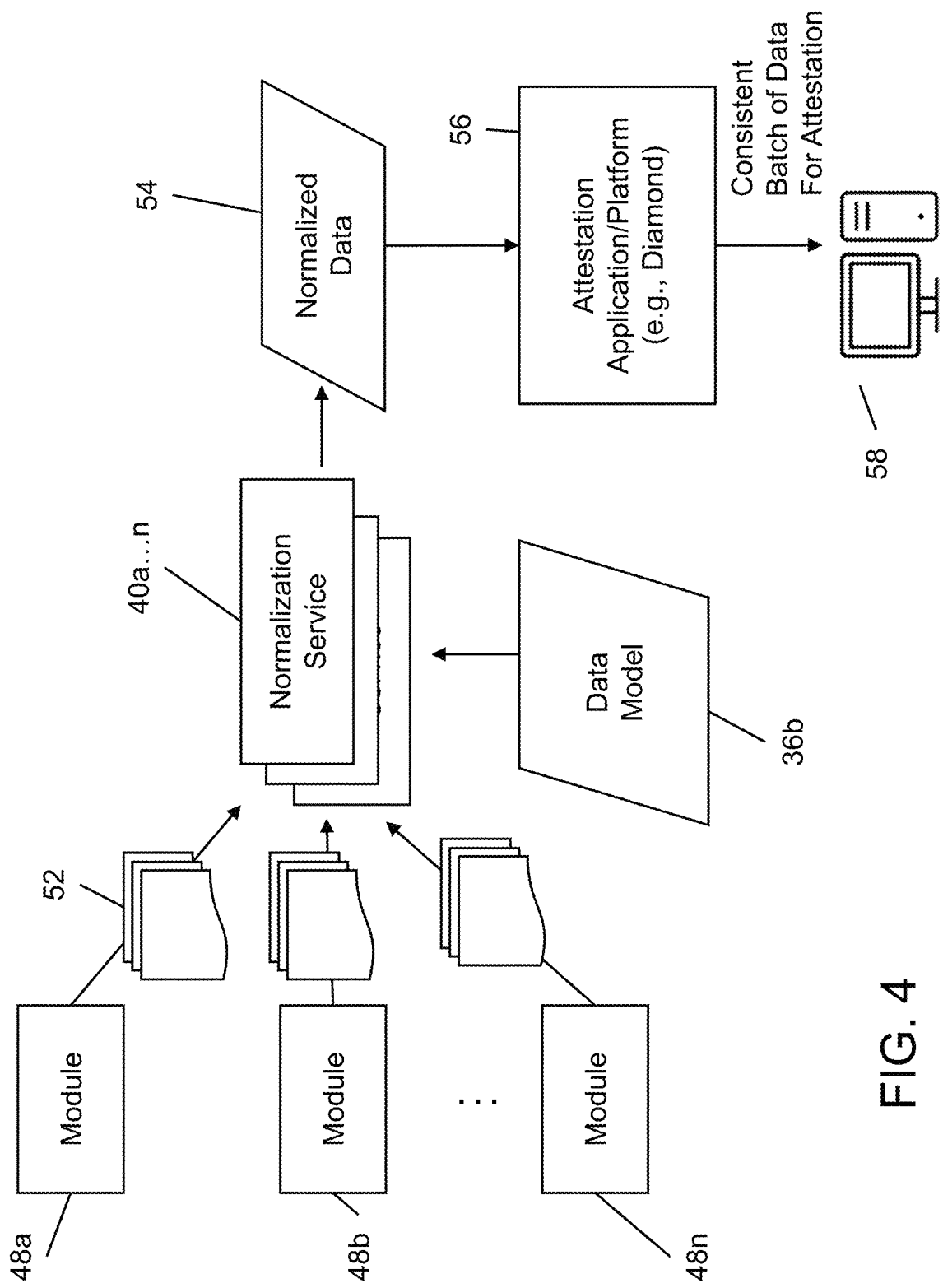
FIG. 4 is a block diagram of another example process for generating tasks.

Referring now to FIG. 4, an example block diagram for generating a workflow complementary to FIG. 3 is shown.

In the shown embodiment, one or more segmented data elements 52 are retrieved from the enterprise endpoint modules 48. The data elements 52 can be retrieved according to the schedule implemented by the task manager 34 based on the queue 32. In example embodiments, the data element that results in segmented data elements 52 is retrieved as a single task in the queue 32, and the segmenting of the data elements into segmented data elements 52 can be a dynamic task that is serialized with the serialized dynamic tasks being stored in the queue 32 (e.g., by the task generator 42). The resulting tasks in the queue 32 can be managed by the task manager 34.

The normalization service 40 ingests the segmented data elements 52 and generates a normalized data structure 54. The normalization service 40 generates the normalized data structure 54 based on at least one aspect of the data model 36b (which may be different than data model 36a, or an aspect of the same model 36, etc.). For example, the data model 36 can specify the resulting normalized data structure 54, or the templates used to arrive at the normalized data structure 54 from the particular endpoint that the data element segment 52 arrives from, etc.

In one example, the data model 36 specifies the following operations by the normalization service 40 to generate the normalized data structure 54. In the discussed example, it is assumed that a data element is a record sequence (e.g., a data element representative of ACL logs of an endpoint) of approximately 3 million rows each containing 3 columns is provided in the following format shown in Table 1:

TABLE 1

Example ACL Log

| Path | IsDirectory | Group | ACL |
|------|-------------|-------|-----|
| Test Path | False | G1 | user::rw |
| | | | group::rwx, group; <serialRepresentationOfGroup>;r-x |
| | | | group:<serialRepresentationOfGroup>:rwx, group:<serial RepresentationOfGroup>:r-x |
| | | | group:<serialRepresentationOfGroup>:rwx,mask::rw-other;:— |

The task generator 42 can be used to create a task to ingest the data element to create a fragmented data element 52 (e.g., a data frame equivalent to a 2 GB payload of assumed data element).

Once the fragmentation task is completed, a set of tasks are generated to process the various fragmented data elements 52.

The task manager 34 assigns the tasks to the normalization service 40 to perform a series of operations to normalize the input fragmented data element 52.

A first type of task of the normalization service 40 can include transforming the fragmented data element 52 into an intermediary data element that includes the example ACL metadata in rows, each row having a single ACL entry. An example is shown in the below Table 2:

TABLE 2

ACL Metadata Row Example

| Is Director | Group | Azure Data Lake Storage |
|-------------|-------|-------------------------|
| False | <serialRepresentationOfGroup> | Ready |
| False | <serialRepresentationOfGroup> | Ready |
| True | <serialRepresentationOfGroup> | Ready |

The transformation normalizes users and groups that were part of a larger string, into multiple records. This division can preserve the ability to search, match and sort combinations of columns. One negative side effect of this normalization can be that the segmented data element's size increases linearly with the numbers of groups that have access to an object. In this example, four groups have non-recursive ownership semantics. Again, in this example, the result is that the size of the segmented data element 52 expands from three million records to over eleven million records.

The resulting segmented data element 52 size becomes problematic for some aspects of processing on the worker node 24 and cluster manager 26 side. Processing this segmented data element 52 on an individual node 24 is manageable, using separate python processes and utilizing processor cycles and memory optimized fashion. However, sharing this volume of data between nodes 24 is problematic. Frequently moving this data between hosts would have a ripple effect on the cluster manager 26 where the compound Python objects representing these payloads need to be reassembled for further processing. Referring now to the previously discussed example that included 2090 workflows, in a best-case scenario, with one group of nodes 24 having access to the storage container, there would be one million records per workflow on average. The serialization compound Python objects representing the categorizations of each workflow, in this scenario, would exceed hundreds of megabytes in size and potentially affect cluster manager 26 post processing and normalization data structure 54 generation. One approach to avoiding this type of scenario is to implement a modified normalization approach to at least in part filter part of the intermediate data structure to provide a meaningful reduction in the amount of ACL metadata being processed. In testing the proposed modified approach was found to reduce 98% of metadata that needed to be processed. The modified approach can be implemented without compromising accurate representation of the ACL structure on the storage point.

The modified approach is based on reporting happening on a folder level if permissions on each object in the folder are consistent. For example, two files with the same groups and permissions in the same folder will not change the result of the group/role attestation. For the purposes of reporting and attesting to access those two files and the folder—are one logical object. However, if those characteristics are different (distinct groups, permissions, or files within a folder) the reporting output will change. The modified approach therefore attempts to reduce the intermediate data frame of the segmented data frame 52 based on one or more uniqueness criteria. In this example, the one or more uniqueness criteria are defined by a set of unique path, group, and ACL column combinations.

The following intermediate data frame of a segmented data frame 52 is provided to aid clarity. In the provided example, the intermediate data frame of the segmented data frame 52 includes three groups and three ACL values for one folder and one file, as shown below in Table 3:

TABLE 3

Example Segmented Data Frame

| Path | IsDirectory | Group | ACL |
|---|---|---|---|
| /a | True | G1 | A1 |
| /a | True | G2 | A2 |
| /a | True | G3 | A3 |
| /a/b | False | G1 | A1 |
| /a/b | False | G2 | A2 |

The modified approach removes rows with permissions that are not used for attestation/reporting (e.g., any input cruft that might have rows indicating no read, no write, and no execute access).

The modified approach includes splitting the filtered intermediate data frame into two separate derivative data elements based on whether the row relates to files or folders. Continuing the example, the resulting split intermediate data frame looks as follows in Table 4:

TABLE 4

Example Split Intermediate Data Frame

| Path | IsDirectory | Group | ACL | Path | IsDirectory | Group | ACL |
|---|---|---|---|---|---|---|---|
| /a | True | G1 | A1 | /a/b | False | G1 | A1 |
| /a | True | G2 | A2 | /a/b | False | G2 | A2 |
| /a | True | G3 | A3 | | | | |

The modified approach includes transposing additional properties (e.g., additional columns) based on the target data model 36. Continuing the earlier example, the derivative file data frame looks as follows, with the entries including transposed folder and file columns as shown in Table 5:

TABLE 5

Example Derivative File Data Frame

| Path | IsDirectory | Group | ACL | Folder | File |
|---|---|---|---|---|---|
| /a/b | False | G1 | A1 | /a | /b |
| /a/b | False | G2 | A2 | /a | /b |

The modified approach includes transposing additional properties to the derivative folder data frame, similar to the derivative file data frame split folder. In this way, the file and folder derivative data maintain consistency. Continuing the earlier example, the folder derivative data element looks as follows, consistency being enforced for all entries as shown below in Table 6:

TABLE 6

Example Folder Derivative Data Element

| Path | IsDirectory | Group | ACL | Folder | File |
|---|---|---|---|---|---|
| /a | True | G1 | A1 | /a | |
| /a | True | G2 | A2 | /a | |
| /a | True | G3 | A3 | /a | |

The modified approach includes performing a join operation to the split folder and file derivative data elements. As a result of the earlier transpositions to the derivative data elements, the resulting intermediate data structure will be consistent. Continuing the earlier example, the resulting intermediate data structure looks as follows in Table 7:

TABLE 7

Example Intermediate Data Structure

| Path | IsDirectory | Group | ACL | Folder | File |
|---|---|---|---|---|---|
| /a | True | G1 | A1 | /a | |
| /a | True | G2 | A2 | /a | |
| /a | True | G3 | A3 | /a | |
| /a/b | False | G1 | A1 | /a | /b |
| /a/b | False | G2 | A2 | /a | /b |

The modified approach includes extracting unique values combinations of Folder, Group and ACL columns to reduce the size of the resulting intermediate data structure, and to generate a final normalized data structure 54.

Some information can be lost in the final step (e.g., every single file (b) was lost, leaving only the folder representation.). As reporting is based on the overall level of access for each user/group, data loss in this case of the example does not indicate a different level of access.

Path structures are preserved so that the modified approach can filter groups of objects based on the path structure. Flexibility is preserved for future use cases where administrators may require treatment based on the specific path formula.

In the test cases of the modified approach, the original fragmented data element 52 was reduced from over three million objects to twelve thousand objects. This is equivalent of a 99.59% reduction in data volume. While this operation does come at an upfront cost, the downstream cost of requiring more involved machine learning and data manipulation, is lowered from the reduced input. Furthermore, this process is well suited to parallelization, and the discussed node architecture. Each additional fragmented data element 52 can be processed independently of the others. horizontal scaling (e.g., via virtual machine nodes 24) can be used to improve overall performance of data reduction.

The segmented data elements 52 can be assigned to the worker nodes 24 for normalization in parallel, as alluded to above. For example, the task manager 34 can manage the queue 32 based on its growth percentage rate. The queue 32 growth percentage rate can be initiated using only dynamic workflows with predefined attestation framework 10 configuration (e.g., based on a particular data model 36). In the discussed example, 2090 workflows with an approximate Growth Rate (GR) of 95% will replace the original set of workflows for the EPS. This feature of the attestation framework 10 defines a load of the operational queue 32 as the starting process signal for worker node(s) 24 to take on work. Attestation framework 10 task manager 34 can implement static (one way and dynamic) multilevel workflows. A batch of the workflows can be processed differently, while outcomes of workflows from the prospective of the cluster manager 26 are the same. Attestation framework 10 workflow reporting fits two categories of finished workflows after the queue 32 is processed completed; 'passed' and 'failed'.

Figure 5:
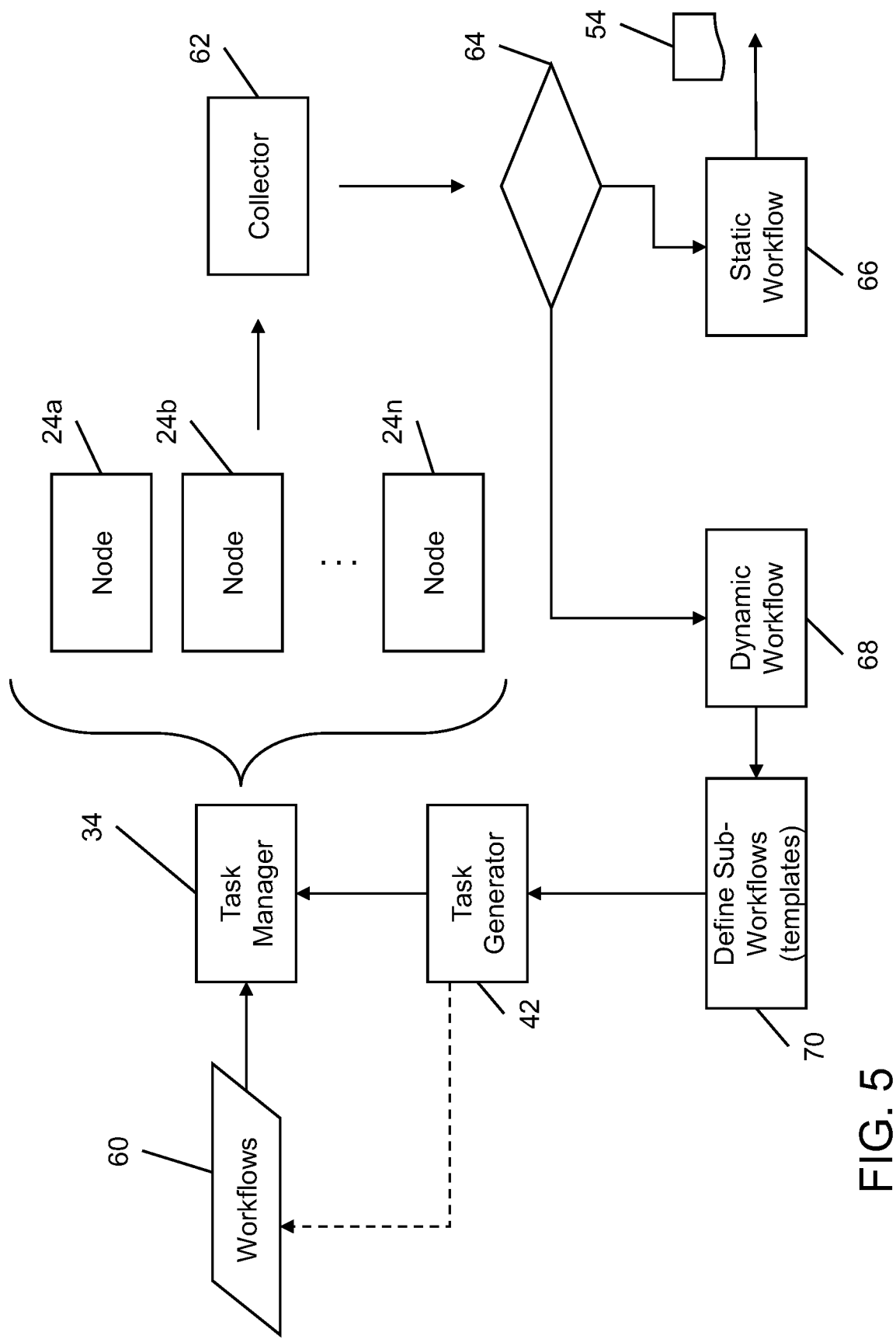
FIG. 5 is a flow diagram of an example process for delineating between task types.

FIG. 5 shows a block diagram of managing workflows.

The task manager 34 becomes aware of the tasks 60. The tasks 60 can include the tasks 50 generated by the discovery service 30 (e.g., as shown in FIG. 3), or tasks generated by the task generator 42 (e.g., workflows generated from a dynamic workflow task), or a combination of the two. That is, the tasks 60 can represent any combination of workflows destined for the queue 32, at any point in time.

The task manager 34 assigns the tasks 60 to a queue 32, which results in the plurality of nodes 24 being provided with same. The task manager 34 can also provide the necessary data elements, credentials to access the endpoint modules 48, links or credentials to a location on a local device 12 storing the retrieved data element metadata, etc.

The nodes 24 complete the tasks 60 assigned thereto. The nodes 24 can either pass or fail the workflow and use the reporting module 44 to report their progress for the particular task 60.

A collector 62, which can be a component of the cluster manager 26, can collect the reported statuses of the nodes 24, and any related data. The collector 62 can serve as a temporary storage for metadata related to the state of the process (e.g., passed or failed), a result of the process (e.g., a normalized data structure, or a fragmented data element 52, etc.), etc.

A routing harness 64 can determine whether to route the information stored in the collector 62 to a dynamic workflow harness 68 or a static workflow harness 66, or to an error process, based on the node 24 performance of the workflow. If the information in the collector 62 is indicative of a failed workflow, an error object can be propagated (e.g., via a custom propagation harness which is not shown). The propagation can include the collector 62 notifying the task manager 34 of the error. If the collector 62 components indicate a failed workflow, but notification of the failure is not propagated, the attestation framework 10 can include a monitoring handler which interacts with the collector 62 to capture an error trace and use that as the value to report to the task manager 34. Absence of any failed workflows is likely indicative of an unstable state of the attestation framework 10. This scenario is likely indicative of a bug in the worker node harness, and the bug fix needs to be identified and fixed. The reporting module 44 can be used to capture and store logs via cluster manager 34 notification. Resolution of the such bugs can include purging the queue 32 of workflows (e.g., purging of tasks 60).

If the collector 62 indicates that the workflow was complete, a static workflow harness 68 or dynamic workflow harness 68 can be implemented.

The static workflow harness 68 can be used to route the information stored in the collector 62 to the worker driver 28 to perform a finite and known set of tasks. For example, the static workflow harness 68 can determine that the collector 62 includes all fragmented data elements 52 in a normalized data structure, for a particular endpoint. The static workflow harness 68 can trigger the worker driver 28 to generate a final normalized data structure 54 (e.g., an XML file) for transferring to downstream services.

The dynamic workflow harness 68 can be used to trigger the task generator 42 to generate new tasks based on the material in the collector (e.g., the retrieved data element, or subtasks associated with processing fragmented data elements 52, etc.).

At block 70, the dynamic workflow harness 68 can retrieve one or more data models 36 used to define and sub-tasks to be generated. The dynamic workflow harness 68 can generate a workflow manifest based on the data model 36, and can identify workflow definitions, workflow dependencies, workflow serialization, etc.

At block 72, the task generator 42 can generate one or more dynamically generated workflows. The task generator 42 can generate workflow objects that are digestible by the task manager 34 while incorporating the definitions and dependencies from block 70. The generated workflow objects can specify which tasks are completed as a result of the generation of the workflow tasks, such that the task manager 34 can monitor overall progress and performance.

The task generator 42 notifies the task manager 34 of the generated dynamic workflows. In example embodiments, the task manager 34 adds the generated dynamic workflows to the queue 32 directly, and the task manager 34 discovers these tasks as part of monitoring queue 32.

Worker nodes 24 can be optimized to process a substantial number of workflows and metadata, in a time-boxed and resource constrained environment. In the case of storage point attestation, the initial operational queue is processed quickly, as it contains a significantly smaller set of metadata. The attestation framework 10 can exclusively use REST API to obtain ancillary data provided by a service.

One approach to optimizing the worker node 24 processes includes optimizing REST service side code (e.g., enterprise module 48), producing a quick search of the storage metadata ACL manifest, implementing the regular expressions and time-based code injections into storage path structure for the latest inventory manifest.

Another approach includes serializing a REST API connection for a storage point on a shared network file system (e.g., NFS) repository.

Figure 6:
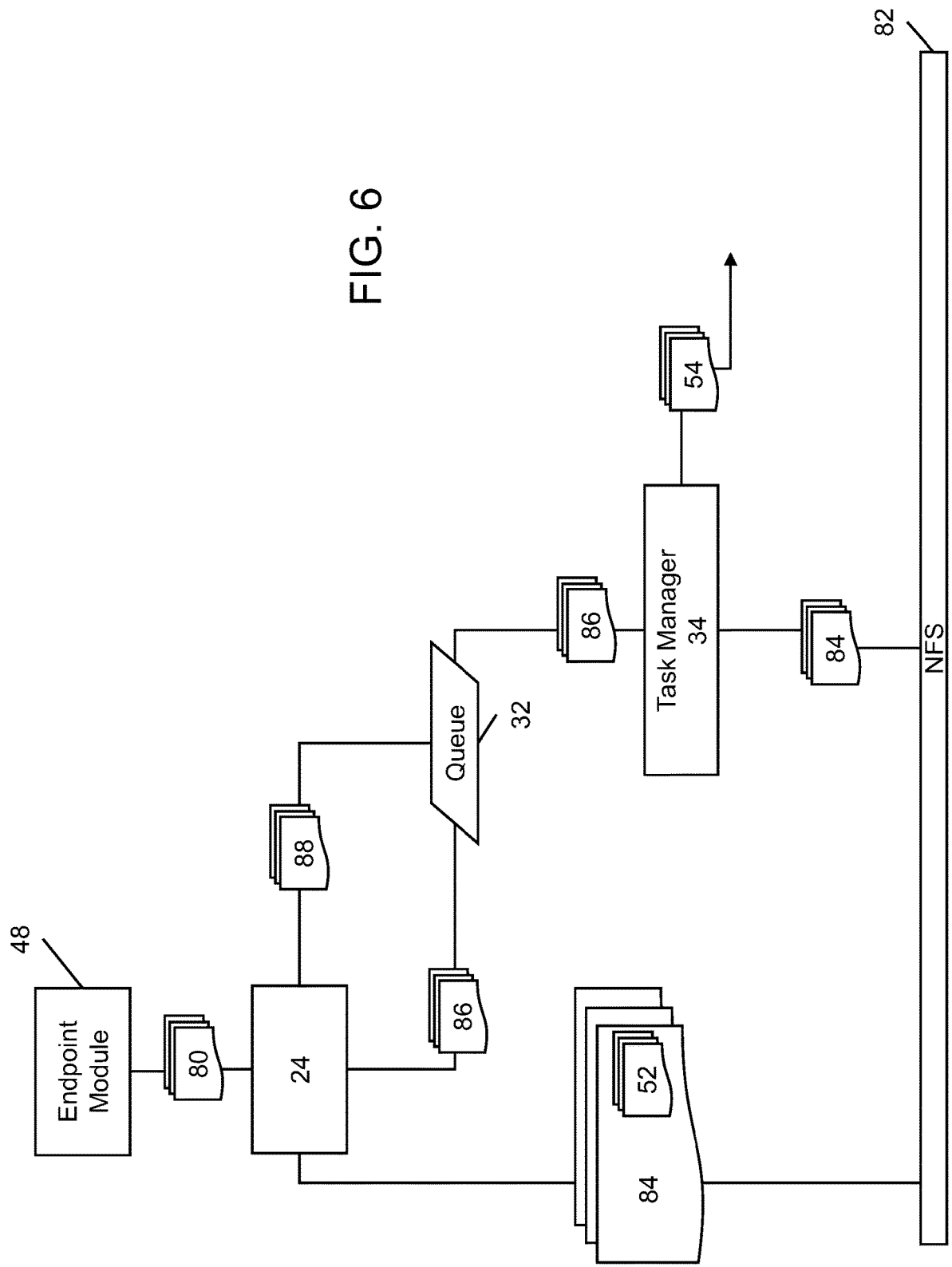
FIG. 6 is a block diagram of an example process for generating a normalized data structure.

Referring now to FIG. 6, and block diagram of an example workflow for normalizing attestation data is shown.

As shown in FIG. 6, the endpoint module 48, after discovery, can transmit (or allow access from) the data element 80 to a node 24. The node 24 can fragment the data element 80 into a plurality of fragmented data elements 52 and generate one or more objects 84 and transmit same to the NFS 82. In example embodiments, the node 24 that retrieves the data element 80 can estimate and report the statistics required or estimated to process the fragmented data elements 52, based on the data models 36.

The NFS 82 can be used to store the fragmented data elements 52 and objects 84 received from the endpoint modules 48, and worker nodes 24 can subsequently perform operations on the copy of the data element stored on the NFS.

The REST API call to the NFS 82 is timely, and unnecessary to replete. The serialization can be completed with existing utilities, or with a custom input/output (IO) utility module that includes a combination of serialization utilities. The serialization enables a persistent lineage serialization path embedded in generated workflow sessions (e.g., objects 84), which allows any worker node 24 to pick a serialized session object (as shown in FIG. 6). The worker node 24 can deserialize a connection object and continue work on subsequent dynamic workflow tasks.

In example embodiments, the task manager 34 generates custom work task including the serialized Python objects 84. Generating the custom work task can include accessing dictionaries and the results of the discovery service 30 on the endpoint 48. The task manager 34 can create a workflow that wraps the custom work task. The task manager 34 can add the workflow that wraps the custom work task to the queue 32. When the queue 32 is exhausted, a new queue for processing new endpoints 48 is added (a new WFQ).

The initial sub-task 86 is initiated (e.g., provided to the queue 32) to consume the, in an example, raw CSV data and produce a normalized data frame 54 as a result. That is, the initial task 86 is provided to the node 24, and the node 24 returns a normalized fragmented data element 88. The operation is sufficiently fast and executes without a relatively large memory footprint on the worker node 24 side. Consuming the raw CSV data in chunks was handed to the normalization service 40 harness. Python virtual machine garbage collector will reuse a free accumulated memory in application memory space and not release it to the UNIX kernel. This is desirable behavior of the interpreter, but it does pose a problem in situations where memory utilization of application is high and in bursts. The initial task 86 can include processed roles, resources, permissions, group compositions, etc., for the endpoint 48 which are stored in the data model 36.

Utilizing the worker driver 28 and spawned processes ensures that data within a spawn process that was finished executing gets allocated from the system heap after processing effort. Additionally, spawning a process yields an inheritance of resources reduced from the parent process.

The worker driver 28 (shown as a worker driver code), executed on worker nodes 24, may be able to handle both vertical and horizontal scaling depending on the specification of work required in the workflow residing in "WFQ". That is, the worker driver 28 can be a decentralized implementation of the service metadata processing module.

Figure 7:
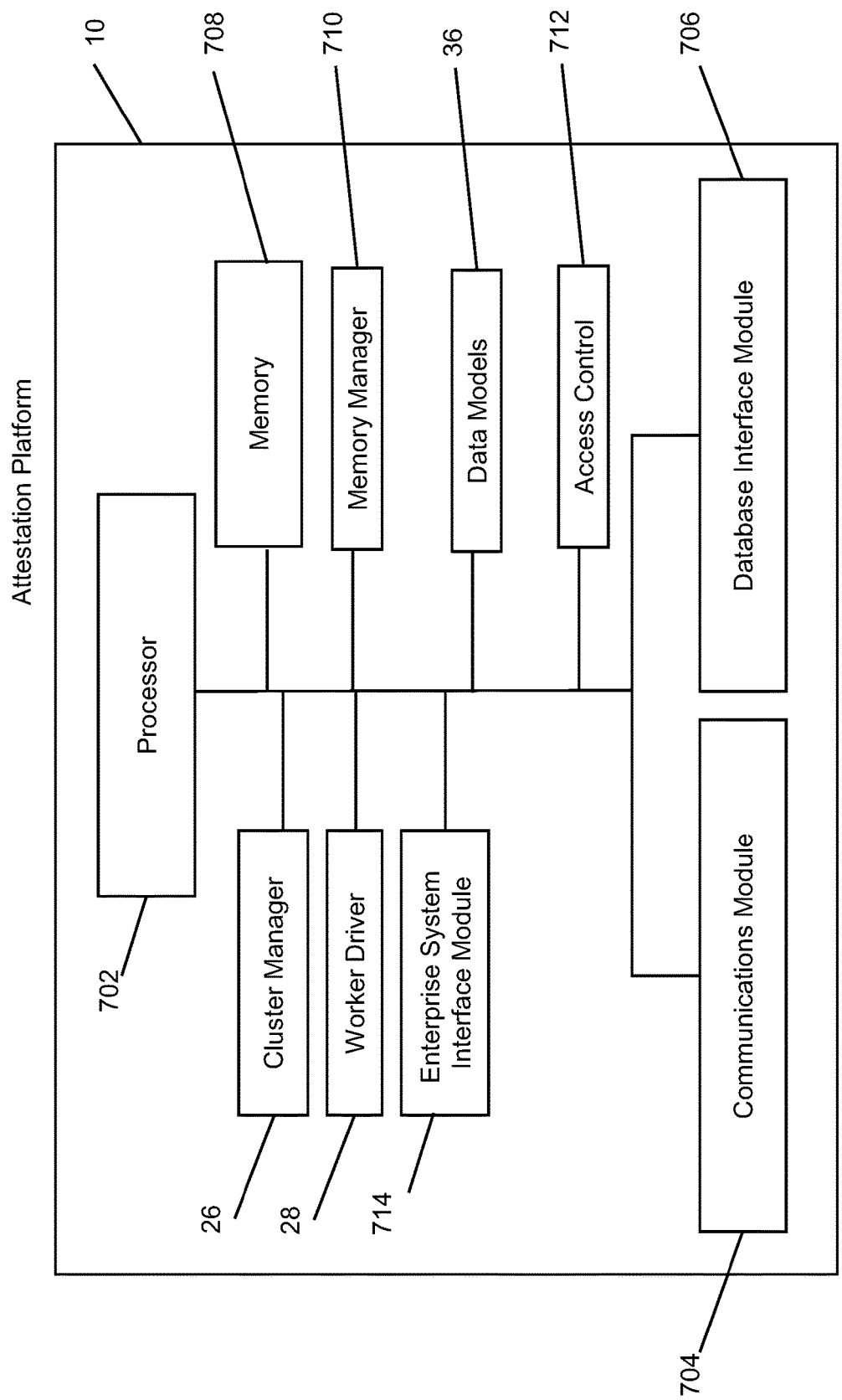
FIG. 7 is a block diagram of an example configuration of an attestation framework.

In FIG. 7, an example configuration of the attestation framework 10 is shown. In certain embodiments, the attestation framework 10 may include one or more processors 702, a communications module 704, and a database interface module 706 for interfacing with the data elements such as endpoints of the enterprise system 16, or other data elements. Communications module 704 enables the attestation framework 10 to communicate with one or more other components of the computing environment 8, such as client device 12 (or one of its components), via a bus or other communication network, such as the communication network 14. The attestation framework 10 includes at least one memory 708 or memory device that can include a tangible and non-transitory computer-readable medium having stored therein computer programs, sets of instructions, code, or data to be executed by processor 702. FIG. 7 illustrates examples of modules, tools and engines stored in memory on the attestation framework 10 and operated by the processor 702. It can be appreciated that any of the modules, tools, and engines shown in FIG. 7 may also be hosted externally and be available to the attestation framework 10, e.g., via the communications module 704. In the example embodiment shown in FIG. 7, the attestation framework 10 includes an access control module 712, a security application 716, and an enterprise system interface module 718.

The attestation framework 10 can also include the data model(s) 36, or input mechanisms to receive same, to enable modularity so that it can process metadata stored in different formats in different endpoints. For example, the data model(s) 36 can include templates to identify the target property (e.g., ACL logs), and templates to perform normalization on the extracted properties. The data model 36 can be a machine learning module and recommendation engine to enable the attestation framework 10 to analyze data elements, to generate templates based on training examples, to determine whether a data element belongs to a particular asset, or includes a target property, generate templates for normalization, etc. Such a recommendation engine may utilize or otherwise interface with a machine learning engine to both classify data currently being analyzed to generate a suggestion or recommendation, and to train classifiers using data that is continually being processed and accessed by the attestation framework 10. This can result in a data model 36 used by the attestation framework 10 to perform such operations.

The access control module 712 may be used to apply a hierarchy of permission levels or otherwise apply predetermined criteria to determine which services receive the normalized data structures generated by the attestation framework 10, which platforms can request same, etc. The access control module 712 can be used to determine which attestation framework 10 configurations can be accessed, modified, etc., by devices 12.

The enterprise system interface module 714 can provide a GUI or API connectivity to communicate with the enterprise system 16 to obtain enterprise data for a certain user (see FIG. 5). It can be appreciated that the enterprise system interface module 714 may also provide a web browser-based interface, an application or "app" interface, a machine language interface, etc.

The attestation framework 10 can include a memory manager 710, which can be a custom memory monitor configured as an independent agent. The memory manager 710 can be a Python garbage collection agent, which will not necessarily lower the pressure on consumed memory if the attestation framework 10 is run in one process and one interpreter. The Python interpreter and Python itself allow the next set of tasks processed by the attestation framework 10 to utilize an existing accumulated memory 708.

Figure 8:
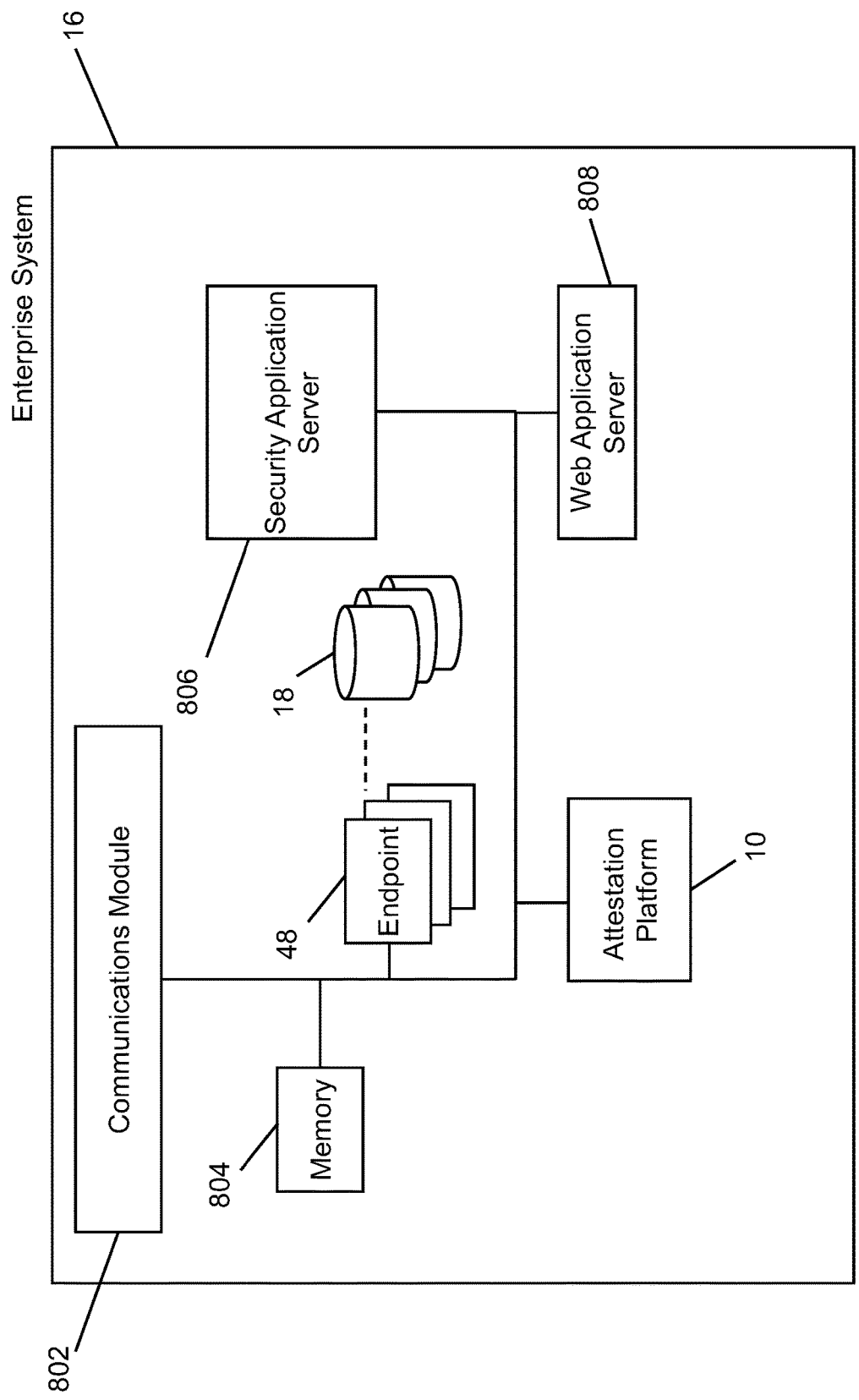
FIG. 8 is a block diagram of an example configuration of an enterprise system.

In FIG. 8, an example configuration of the enterprise system 16 is shown. The enterprise system 16 includes a communications module 802 that enables the enterprise system 16 to communicate with one or more other components of the computing environment 8, such as client device 12 (or one of its components) or attestation framework 10, via a bus or other communication network, such as the communication network 14. The enterprise system 16 includes at least one memory 804 or memory device that can include a tangible and non-transitory computer-readable medium having stored therein computer programs, sets of instructions, code, or data to be executed by one or more processors (not shown for clarity of illustration). FIG. 8 illustrates examples of servers and datastores/databases operable within the system 16. It can be appreciated that any of the components shown in FIG. 8 may also be hosted externally and be available to the system 16, e.g., via the communications module 802.

In the example embodiment shown in FIG. 8, the enterprise system 16 includes one or more servers to provide access to the endpoints (shown via endpoint modules 48 and related datastore 18). One or more servers enable the attestation framework 10 to interface with existing components, services, departments, and lines of business implemented by the enterprise system 16. Exemplary servers utilized by the enterprise system 16 include a security application server 806, and a web application server 808. Although not shown in FIG. 8, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as datastore 18 for storing sensitive.

Security application server 806 supports interactions with the framework 10 directly when a corresponding security application is installed on the client device 12 within an enterprise system 16. Security application server 806 can access other resources of the enterprise system 16 to carry out requests made by the corresponding security application, and to provide content and data to the corresponding security application on client device 12. In certain example embodiments, security application server 806 supports an employee mobile desktop, etc.

Web application server 808 supports interactions using a website accessed by a web browser application 920 (see FIG. 9) running on the client device 12. It can be appreciated that the security application server 806 and the web application server 808 can provide different front endpoints for the same application, that is, the mobile (app) and web (browser) versions of the same application of the framework 10. For example, the enterprise system 16 may provide a security application for access by different employees (or related contractors) that be accessed via a client device 12 via a dedicated application, while also being accessible via a browser on any browser-enabled device.

Figure 9:
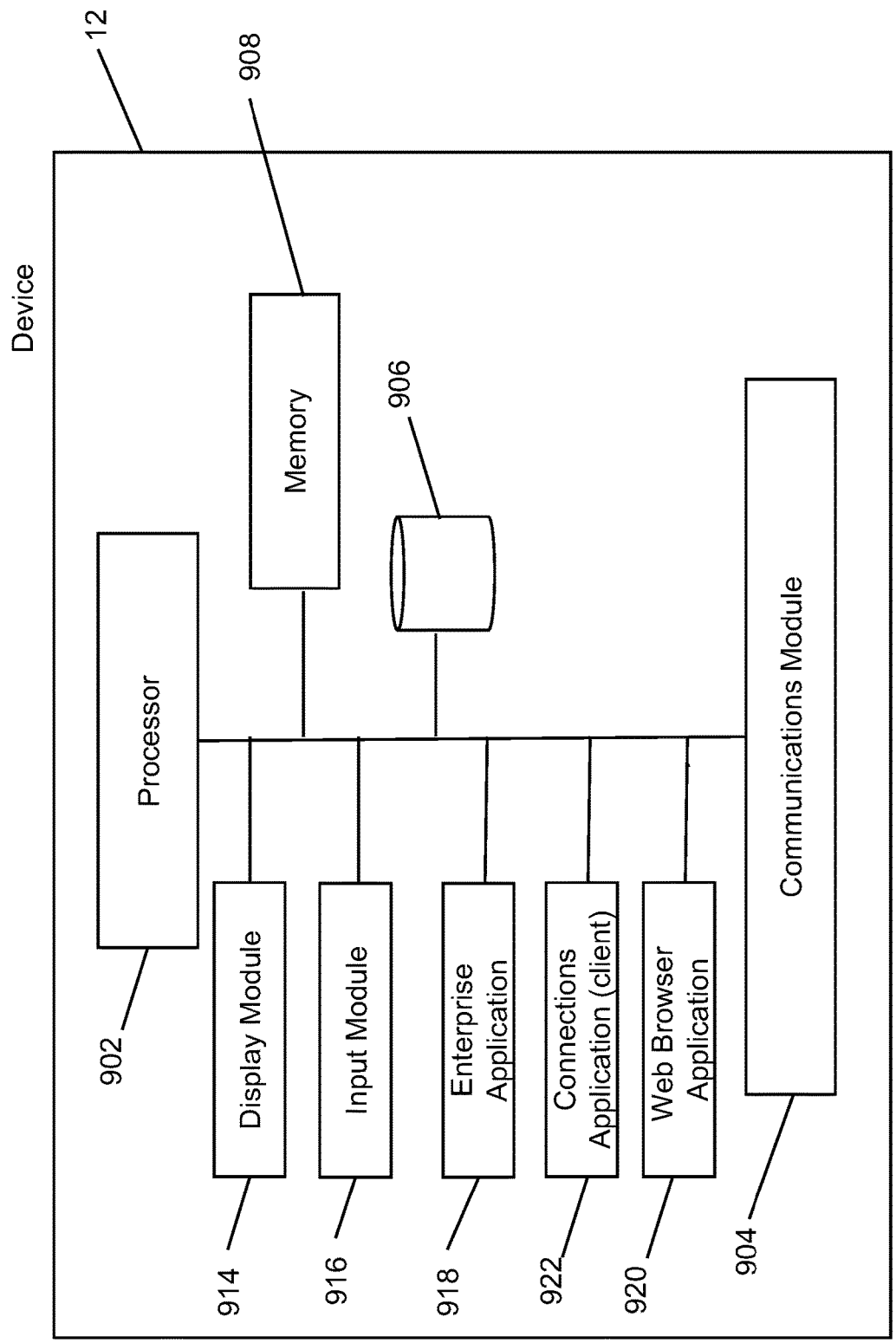
FIG. 9 is a block diagram of an example configuration of a computing device associated with a user, customer, or client.

In FIG. 9, an example configuration of the client device 12 is shown. In certain embodiments, the client device 12 may include one or more processors 902, a communications module 904, and a datastore(s) 906, storing one or more data elements (or fragments thereof), or target properties that are to be the subject of normalization. Communications module 904 enables the client device 12 to communicate with one or more other components of the computing environment 8, such as the attestation framework 10 or enterprise system 16, via a bus or other communication network, such as the communication network 14. At least one memory 908 or memory device that can include a tangible and non-transitory computer-readable medium having stored therein computer programs, sets of instructions, code, or data to be executed by processor 902 can be part of device 12. FIG. 9 illustrates examples of modules and applications stored in memory on the client device 12 and operated by the processor 902. It can be appreciated that any of the modules and applications shown in FIG. 9 may also be hosted externally and be available to the client device 12, e.g., via the communications module 904.

In the example embodiment shown in FIG. 9, the client device 12 includes a display module 914 for rendering GUIs and other visual outputs on a display device such as a display screen, and an input module 916 for processing user or other inputs received at the client device 12, e.g., via a touchscreen, input button, transceiver, microphone, keyboard, etc. The client device 12 may also include an enterprise application 918 provided by the enterprise system 16, e.g., for remotely controlling the attestation framework 10 or related components. The client device 12 in this example embodiment also includes a web browser application 920 for accessing Internet-based content, e.g., via a mobile or traditional website. In this example, the client device 12 also includes a connections application 922, which corresponds to a client-based application to access and interface with the security application 912 hosted by the attestation framework 10.

The datastore 906 may be used to store device data, such as, but not limited to, an IP address or a MAC address that uniquely identifies client device 12 within environment 8. The datastore 906 may also be used to store application data, such as, but not limited to, login credentials, user preferences, cryptographic data (e.g., cryptographic keys), etc.

It will be appreciated that only certain modules, applications, tools, and engines are shown in FIGS. 7 to 9 for ease of illustration and various other components would be provided and utilized by the attestation framework 10, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in attestation framework 10 or enterprise system 16, or client device 12, or accessible or connectable thereto. Any application or module herein described may be implemented using computer readable/executable instructions that may be stored or otherwise held by such computer readable media.

Referring now to FIG. 10, an example embodiment of computer executable instructions for processing hierarchical data is shown.

At block 1002, the attestation framework 10 (or the enterprise system 16, or client device 12) generates a first set of tasks to retrieve a plurality of target properties (e.g., ACL objects) in the form of a data element as a plurality of fragmented objects.

At block 1004, the first set of tasks is assigned to a queue (e.g., by the task manager 34). The plurality of nodes 24 can complete tasks in the queue 32.

At block 1006, a second set of tasks to process the plurality of fragmented objects from a first data structure into a normalized data structure is automatically generated.

At block 1008, the second set of tasks are assigned to the queue 32 via the task manager 34.

At block 1010, the respective fragmented object associated with a task of the second set of tasks is normalized into the normalized data structure, and completion of the task is reported.

At block 1012, a third task to generate a final normalized data structure for the data element is generated.

At block 1014, the final normalized data structure is generated by aggregating the fragmented normalized data structures processed by the nodes.

At block 1016, the final normalized data structure is provided to an attestation service.

In example embodiments, as alluded to above, the method shown in FIG. 10 is at least in part automated. For example, the cluster manager 26 can scan endpoints periodically. These automated systems may reduce the computational burden, the latency of the security analysis process, etc.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for managing resources for access regimes, the method executed by a device and comprising:
   generating a first set of tasks to retrieve a plurality of target properties from a data element as a plurality of fragmented objects;
   assigning the first set of tasks to a queue, a plurality of nodes performing tasks in the queue;
   automatically generating a second set of tasks to process the plurality of fragmented objects from a first data structure into a normalized data structure;
   assigning the second set of tasks to the queue, at least some nodes of the plurality of nodes configured to:
      normalize a respective fragmented object associated with a task of the second set of tasks into the normalized data structure;
      update the queue in response to completing normalization for the respective fragmented object;
      generate a third task to generate a final normalized data structure for the data element; and
      generate the final normalized data structure by aggregating the normalized fragmented objects processed by the plurality of nodes retrieving, by the plurality of nodes, tasks from the queue based on a first in first out methodology.

2. The method of claim 1, wherein the first and second set of tasks are dynamically generated based on a static scanning task to identify the plurality of target properties of the data element.

3. The method of claim 1, wherein each of the plurality of fragmented objects is limited to a target size, and an amount of the first set of tasks is based on the target size and a number of the plurality of target properties.

4. The method of claim 1, wherein normalizing the respective fragmented object comprises:
   removing records of the first data structure which do not include target access permissions;
   removing records of the first data structure based on whether they satisfy one or more uniqueness criteria; and
   generating the normalized data structure based on the resulting first data structure.

5. The method of claim 4, wherein the one or more uniqueness criteria include at least a combination of a file path, group, and target property.

6. The method of claim 4, wherein, removing records of the first data structure based on whether they satisfy one or more uniqueness criteria comprises:
   manipulating the first data structure into a second data structure where each of the one or more uniqueness criteria are a separate column; and
   parsing the second data structure to remove duplicate records based on the manipulated first data structure.

7. The method of claim 6, wherein, manipulating the first data structure into the second data structure comprises:
   splitting the first data structure into separate data frames;
   for each split data frame being, manipulating records to ensure each of the one or more uniqueness criteria are a separate column; and
   populating the second data structure by aggregating the split data frames, where records of the first data structure are updated to include entries for the uniqueness criteria.

8. The method of claim 1, the method further comprising:
   providing a processing monitor;
   determining, by the processing monitor, that a node of the plurality of nodes has a threshold amount of processing capacity;
   deserializing the at least some of the plurality of fragmented objects associated with first set of tasks to create a larger task, the larger task based on the threshold amount of processing; and
   assigning the larger task to the node.

9. The method of claim 1, wherein normalization of the respective fragmented object is based on a data model that uses a machine learning engine.

10. A device for managing digital access, the device comprising:
    a processor;
    a memory coupled to the processor, the memory storing computer executable instructions that when executed by the processor cause the device to:
       generate a first set of tasks to retrieve a plurality of target properties from a data element as a plurality of fragmented objects;
       assign the first set of tasks to a queue, a plurality of nodes performing tasks in the queue;
       automatically generate a second set of tasks to process the plurality of fragmented objects from a first data structure into a normalized data structure;
       assign the second set of tasks to the queue, at least some nodes of the plurality of nodes configured to:
          normalize a respective fragmented object associated with a task of the second set of tasks into the normalized data structure;
          update the queue in response to completing normalization for the respective fragmented object;
          generate a third task to generate a final normalized data structure for the data element; and
          generate the final normalized data structure by aggregating the normalized fragmented objects processed by the plurality of nodes; and
       retrieve, by the plurality of nodes, tasks from the queue based on a first in first out methodology.

11. The device of claim 10, wherein the instructions cause the device to normalize the respective fragmented object by:
    removing records from the respective fragmented object which do not include target access permissions;
    removing records from the respective fragmented object based on whether they satisfy one or more uniqueness criteria; and generating the normalized data structure based on the updated fragmented object.

12. The device of claim 11, wherein the one or more uniqueness criteria include at least a combination of a file path, group, and target property.

13. The device of claim 11, wherein the instructions cause the device to remove records from the fragmented object based on whether they satisfy one or more uniqueness criteria by:
   manipulating from the fragmented object from the first data structure into a second data structure where each of the one or more uniqueness criteria are a separate column; and
   parsing the manipulated fragmented object to remove duplicate.

14. The device of claim 13, wherein the instructions cause the device to manipulate the fragmented object into the second data structure by:
   splitting the fragmented object into separate data frames;
   for each split data frame being, manipulating records to ensure each of the one or more uniqueness criteria are a separate column; and
   populating the fragmented object into the second data structure by aggregating the split data frames, where records in the first data structure are updated to include entries for the uniqueness criteria in the second data structure.

15. The device of claim 14, wherein the data element is one of a plurality of data elements, and wherein, to normalize the respective fragmented object for different enterprise partitions, the instructions cause the device to:
   determine a data model associated with a related enterprise partition, wherein the data model enables conversion from the first data structure of the enterprise partition into the normalized data structure;
   normalize the respective fragmented objects with the determined data model.

16. The device of claim 10, wherein the instructions cause the device to:
   provide the final normalized data structure to an attestation service; and
   enable the attestation service to grant access permissions in response to requests to access one of the data elements.

17. The device of claim 10, wherein the first and second set of tasks are dynamically generated based on a static scanning task to identify the plurality of target properties of the data element.

18. The device of claim 10, wherein normalization of the respective fragmented object is based on a data model that uses a machine learning engine.

19. A non-transitory computer readable medium for managing resources for access regimes, the computer readable medium comprising computer executable instructions for:
   generating a first set of tasks to retrieve a plurality of target properties from a data element as a plurality of fragmented objects;
   assigning the first set of tasks to a queue, a plurality of nodes performing tasks in the queue;
   automatically generating a second set of tasks to process the plurality of fragmented objects from a first data structure into a normalized data structure;
   assigning the second set of tasks to the queue, at least some nodes of the plurality of nodes configured to:
      normalize a respective fragmented object associated with a task of the second set of tasks into the normalized data structure;
      update the queue in response to completing normalization for the respective fragmented object;
      generate a third task to generate a final normalized data structure for the data element; and
      generate the final normalized data structure by aggregating the normalized fragmented objects processed by the plurality of nodes; and
   retrieving, by the plurality of nodes, tasks from the queue based on a first in first out methodology.

20. The computer readable medium of claim 19, wherein normalization of the respective fragmented object is based on a data model that uses a machine learning engine.

* * * * *